(12) United States Patent
Coombes et al.

(10) Patent No.: US 10,132,687 B2
(45) Date of Patent: Nov. 20, 2018

(54) THREE-DIMENSIONAL VLC/DLC SENSOR CLIP

(71) Applicant: Gooee Limited, St Albans (GB)

(72) Inventors: Simon Coombes, St Petersburg, FL (US); Shmuel Silverman, Novato, CA (US)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 15/840,078

(22) Filed: Dec. 13, 2017

(65) Prior Publication Data

US 2018/0100763 A1 Apr. 12, 2018

Related U.S. Application Data

(63) Continuation-in-part of application No. 15/586,745, filed on May 4, 2017, now Pat. No. 9,874,478, which is a continuation-in-part of application No. 29/569,839, filed on Jun. 30, 2016, now Pat. No. Des. 808,826.

(Continued)

(51) Int. Cl.
*G01J 3/50* (2006.01)
*G01J 3/02* (2006.01)
*G01J 1/02* (2006.01)
*G01J 1/42* (2006.01)

(Continued)

(52) U.S. Cl.
CPC ............ *G01J 3/505* (2013.01); *G01J 1/0271* (2013.01); *G01J 1/4204* (2013.01); *G01J 3/0291* (2013.01); *G01J 3/51* (2013.01); *H05B 33/089* (2013.01)

(58) Field of Classification Search
CPC .. G01J 3/505; G01J 3/51; G01J 3/0291; G01J 1/4204; G01J 1/0271; H05B 33/089
See application file for complete search history.

(56) References Cited

U.S. PATENT DOCUMENTS

D274,297 S 6/1984 Wright
D331,203 S 11/1992 Collister
(Continued)

FOREIGN PATENT DOCUMENTS

CN 106375005 A 2/2017
EP 2149746 A2 2/2010
(Continued)

OTHER PUBLICATIONS alibaba.com, PDP Kinect TV Mount—Xbox One, 3 pgs., https://guide.alibaba.com/shop/pdp-kinect-tv-mount-xbox-one_3162680.html.

(Continued)

*Primary Examiner* — David V Bruce
(74) *Attorney, Agent, or Firm* — Moyles IP, LLC

(57) ABSTRACT

Devices, systems, and methods are disclosed for attaching a sensor system to luminaires of a variety of shapes and sizes. Specifically, a 3D sensor clip is disclosed with adjustable components configured to attached the 3D sensor clip to a luminaire such as to adjust the position of a color sensor in the 3D sensor clip relative to a luminaire. Devices, systems, and methods are also disclosed for using visual light communication (VLC)/dark light communication (DLC) for communications in a lighting system, including automated identification of luminaires.

20 Claims, 22 Drawing Sheets

Related U.S. Application Data

(60) Provisional application No. 62/582,734, filed on Nov. 7, 2017, provisional application No. 62/490,388, filed on Apr. 26, 2017.

(51) Int. Cl.
*G01J 3/51* (2006.01)
*H05B 33/08* (2006.01)

(56) References Cited

U.S. PATENT DOCUMENTS

| | | | |
|---|---|---|---|
| D346,791 S | 5/1994 | Marach et al. | |
| 5,602,384 A * | 2/1997 | Nunogaki | B60H 1/0075 |
| | | | 126/573 |
| D431,198 S | 9/2000 | Monaco et al. | |
| D618,332 S | 6/2010 | Kimura et al. | |
| D627,503 S | 11/2010 | Postelmans | |
| 7,862,202 B2 | 1/2011 | Laso et al. | |
| D664,877 S | 8/2012 | Krumpe et al. | |
| D672,264 S | 12/2012 | Ochoa | |
| D695,592 S | 12/2013 | White | |
| 8,636,385 B2 | 1/2014 | Fabbri et al. | |
| 8,928,232 B2 | 1/2015 | Aggarwal et al. | |
| 9,046,244 B2 | 6/2015 | Yang | |
| D742,334 S | 11/2015 | Pratt et al. | |
| 9,288,877 B2 | 3/2016 | Pratt et al. | |
| D757,344 S | 5/2016 | Reynolds | |
| 9,332,610 B2 | 5/2016 | Kuo et al. | |
| D762,583 S | 8/2016 | Dick | |
| D772,693 S | 11/2016 | Beadle | |
| D775,410 S | 12/2016 | Klus | |
| D775,512 S | 1/2017 | White | |
| 9,980,337 B1 | 5/2018 | Coombes et al. | |
| 2008/0204437 A1 | 8/2008 | Jensen | |
| 2011/0031897 A1 | 2/2011 | Henig et al. | |
| 2011/0248152 A1 * | 10/2011 | Svajda | G01S 3/7803 |
| | | | 250/221 |
| 2013/0221203 A1 | 8/2013 | Barrilleaux | |
| 2014/0265870 A1 | 9/2014 | Walma et al. | |
| 2014/0375217 A1 | 12/2014 | Feri et al. | |
| 2015/0338077 A1 | 11/2015 | Johnson | |
| 2016/0245688 A1 * | 8/2016 | Verbeek | G01J 1/06 |
| 2017/0094755 A1 | 3/2017 | Daranyi et al. | |
| 2017/0286889 A1 | 10/2017 | Yu et al. | |
| 2018/0076891 A1 | 3/2018 | Agrawal et al. | |

FOREIGN PATENT DOCUMENTS

| | | |
|---|---|---|
| JP | 2003086019 A1 | 3/2003 |
| WO | 2015032721 A1 | 3/2015 |
| WO | WO-2016039690 A1 | 3/2016 |

OTHER PUBLICATIONS

Double Radius, Ubiquiti Current Sensor, Clip-On Alternating Current, 2 pgs, http://www.doubleradius.com/Manufacturers/mFi-1/Ubiquiti-Current-Sensor-mFi-CS.html.

International Search Report of International App. No. PCT/162018/052913, dated Aug. 20, 2018, which is in the same family as U.S. Appl. No. 15/840,078, 4 pgs.

Written Opinion of International App. No. PCT/IB2018/052913, dated Aug. 20, 2018, which is in the same family as U.S. Appl. No. 15/840,078, 10 pgs.

Yinan Hou et al., A RSS/AOA based indoor positioning system with a single LED lamp, presented at 2015 International Conference of Wireless Communications & Signal Processing (WCSP) IEEE, Oct. 15, 2015, 4 pgs, https://zapdf.com/aoa-based-indoor-positioning-system-with-a-single-led-lamp.html.

U.S. Office Action dated Sep. 11, 2018 in U.S. Appl. No. 15/809,739, dated Nov. 10, 2017.

International Search Report of International App. No. PCT/IB2018/053749, dated Sep. 27, 2018, which is in the same family as U.S. Pat. No. 9,980,337B1, 4 pgs.

International Written Opinion of International App. No. PCT/IB2018/053749, Sep. 27, 2018, which is in the same family as U.S. Pat. No. 9,980,337B1, 21 pgs.

\* cited by examiner

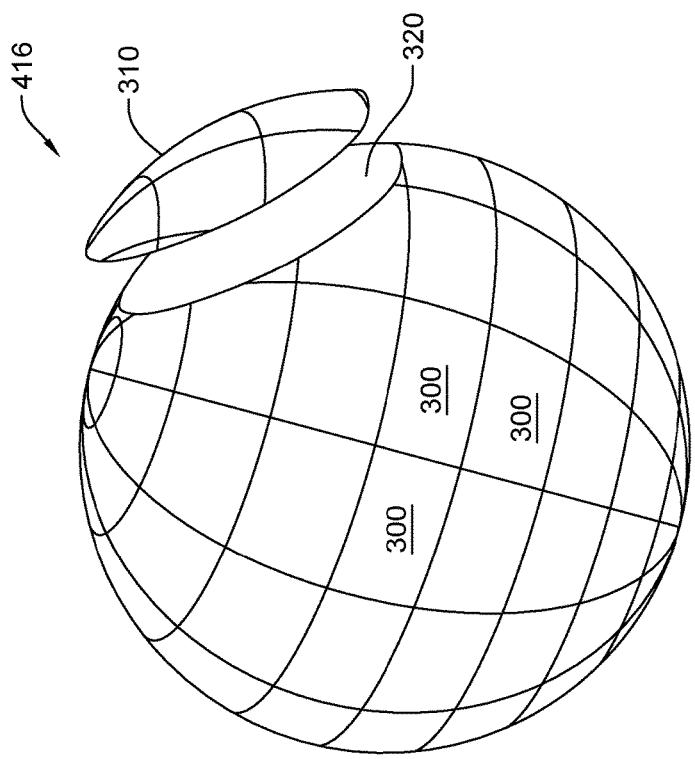

THREE-DIMENSIONAL VLC/DLC SENSOR CLIP

CROSS-REFERENCE TO RELATED APPLICATIONS

This application is a continuation-in-part of and claims priority to U.S. patent application Ser. No. 15/586,745 filed May 4, 2017, which claims priority to U.S. patent application Ser. No. 29/569,839 filed Jun. 30, 2016 and the benefit of U.S. Provisional Patent Application Ser. No. 62/490,388 filed Apr. 26, 2017. This application also claims the benefit of U.S. Provisional Patent Application Ser. No. 62/582,734 filed Nov. 7, 2017. The disclosure of each of the above applications is incorporated herein by reference in their entireties.

FIELD OF THE DISCLOSURE

The present disclosure relates to devices, systems, and methods for measuring with one or more sensors direct and indirect light from one or more luminaires and/or parameters of an environment in which the one or more luminaires are installed. In certain exemplary embodiments, the sensors are attached to a luminaire via an adjustable three-dimensional (3D) sensor clip having movably configurable components that allow the sensor clip to adapt for attachment to a variety of luminaire shapes and sizes.

BACKGROUND OF THE DISCLOSURE

Lighting control systems must dynamically initialize, manage, and control the lumen level of luminaires as they set up light scenes and manage them in space and time. Current large lighting control systems are typically digitally networked systems that address luminaires individually and allow remote management of the individual luminaires via network access. Such lighting control systems are typically integrated as subsystems into building management systems.

For purposes of this disclosure, a lighting control system or network means one or more devices or systems, and/or an associated method(s), for, without limitation, installed/installing light sources, maintained/maintaining light sources, and/or controlled/controlling lighting schemes. Further, for purposes of this disclosure, "luminaire" means, without limitation, an electric light unit that may include, for example, one or more light-emitting diodes (LEDs) or other light source(s), electric ballasts, and/or a diming device, driver or controller.

In addition, for purposes of this disclosure, a "driver" is generally and without limitation a device or system that controls illumination of a luminaire—such as a dimming Visual Light Communication (VLC)/Dark Light Communication (DLC) control interface—but may also refer to any component that actuates a device, system, or method consistent with this disclosure.

Moreover, for purposes of this disclosure, the phrases "devices," "systems," and "methods" may be used either individually or in any combination referring without limitation to disclosed components, grouping, arrangements, steps, functions, or processes. For example, a lighting control system or network may include at least one of an electrical ballast, a luminaire including a light source such as an LED, a gateway for controlling illumination of the light source, and a dimming control interface to execute dimming commands for the light source. The dimmer controls must support specific interfaces to be able to receive control inputs and dim the light appropriately.

LEDs in particular have become regular light sources for use in luminaires particularly because LEDs do not fail abruptly like light sources such as incandescent or fluorescent bulbs. Instead, the lumen level (light output) of an LED slowly diminishes over time. Thus, a luminaire may be attached to a plurality of sensors that monitor the degradation of the luminaire as part of the lighting system maintenance and control. Certain sensors may measure, for example and without limitation, the lumen level, color content, color intensity, etc. of the luminaire at various dimming levels. The sensors may also include environment sensors to detect, among other things, ambient light, electrical and magnetic fields, temperature, motion, footfall (i.e., the number of people passing through or present in a given environment), and other aspects of the environment in which the luminaire is installed. For purposes of this disclosure, "environment" means generally and without limitation a space in which a luminaire or lighting device is installed.

Current lighting systems may include sensors which are located in close proximity with luminaires/light sources and are therefore directly exposed to light with potentially high luminous intensity coming out of the luminaires. Further, the electrical emissions around the luminaires can impact close proximity sensors. Luminaires with different lumen electrical emission impacts light sensing, environmental sensing, low resolution camera sensors, and other components and functions of the sensor systems. To avoid many of these problems, current sensor systems are custom designed to fit specific luminaires by shape and considering the electrical and lumen emissions. Thus, the current process for designing compatible sensor systems is not dynamic—i.e., a single sensor or sensor subsystem may not necessarily work with a replacement luminaire that is required during the life of the lighting system.

In addition, typical sensors used in lighting systems are sensitive instruments and high luminous intensities can easily overload and damage the sensor capacities and components. High lumen levels encountered by the sensor(s) can also create erroneous readings leading to inaccuracies in the collected data. Furthermore, some filters such as, among other things an Integrated Infrared (IR) filter that is used with the sensor can also be degraded by high lumen levels, leading to a lower lifetime of the sensor and/or filter.

Regarding communication of information between sensors and other components within lighting systems, one potential method is Visual Light Communication (VLC)/Dark Light Communication (DLC). VLC refers to communication using light signals in the visible light bandwidth while DLC refers to communication using light signals in the non-visible light bandwidth. VLC has the particularly beneficial capability to use the same illumination source for communication and illuminating the environment in which it is installed. In addition, the replacement of many florescent lamps with LEDs in the lighting industry makes VLC useful as a communication method for at least the reasons explained below.

For example, VLC has certain benefits over communication methods such as Radio Frequency (RF) communication because of the VLC's high bandwidth and immunity to interference from electromagnetic sources. VLC uses a light source that is frequency modulated, i.e., turned on and off rapidly when transmitting a communication. VLC systems communicate with visible light that occupies the spectrum from 380 nm to 750 nm corresponding to a frequency spectrum of 430 THz to 790 THz. Thus, VLC has a larger bandwidth compared to the bandwidth of radio frequency signals in RF communications. In addition, VLC may have certain security benefits compared to RF signals which may be intercepted and/or decoded from remote locations. Further, a visible light source may be used for both illumination and communication which conserves power that would be required to drive separate systems such as RF communications.

In view of the above, there is a need for devices, systems, and methods for enhancing, among other things, lighting system installation, maintenance, and control with VLC-based transmitters and receivers. In addition, there is a need for devices, systems, and methods that use VLC-based transmitters and receivers to identify luminaires in a lighting system, including the relative distance and direction of a visual-light transmitting luminaire to a VLC receiver. There is also a need for lighting system sensors that are configured to provide information about the light sources and their environment while being adaptable to installation in various locations and shielded from high levels of exposure to light.

BRIEF DESCRIPTION OF THE EXEMPLARY EMBODIMENTS

In various aspects, the exemplary disclosed embodiments include a three-dimensional (3D) sensor clip having sensors for measuring conditions of a luminaire and an environment in which the luminaire is installed, the 3D sensor clip being attachable to luminaires having a variety of different shapes and sizes by adjusting vertical and horizontal adjustment components. The adjustment components include, among other things, at least one of a horizontal sensor housing and a vertical attachment member extending from the 3D sensor clip such that an attachment arm can grasp onto at least a portion of a luminaire.

In certain exemplary disclosed embodiments, at least one of the sensors on the 3D sensor clip is an upward facing (i.e., facing directly towards a luminaire) color sensor while others are downward facing (i.e., facing away from or in a downward direction from the luminaire) environment sensors. The exemplary disclosed embodiments of a 3D sensor clip include a sectorized VLC/DLC receiver having one of a variety of geometric shapes which include multiple face 3D or semi 3D surface sensors (facets) comprising pixels to receive visual light transmitted from a transmitted luminaire. The transmitting luminaire may be part of an exemplary system including a gateway that controls visual light transmission of the luminaire. As part of the exemplary system and an exemplary method, the sectorized VLC/DLC sensor transmits information regarding the received visual light to a server, either directly or via the gateway, and the server determines from the information at least one of the identity of the luminaire and the relative distance and direction of the luminaire from the sectorized VLC/DLC receiver. In a further aspect of the exemplary disclosed embodiments, at least one of the sensors may be an orientation sensor such as a magnetometer 3D sensor/orientation sensor to sense the orientation of the 3D sensor clip and/or the sectorized VLC/DLC receiver such as to allow the system to determine the direction in which the surface sensors of the sectorized VLC/DLC receiver are facing and thereby the relative direction of the transmitting luminaire from which visual light is received at the sectorized VLC/DLC receiver. Certain exemplary disclosed 3D sensor clips comprise sensors situated back to back (i.e., facing in opposite directions).

In the exemplary disclosed embodiments, the 3D sensor clip is adjustable to fit luminaires such that upward facing sensors are directly exposed to the light that the luminaire emits and downward facing sensors generally face away from the light. The exemplary adjustable 3D sensor clip may also attenuate the amount of light to which the upward facing sensor is exposed by adjusting the position of the 3D sensor clip and thereby the position of the upward facing sensor with respect to the luminaire such as to, for example, move the upward facing sensor further away from the luminaire. Attenuating the amount of light to which the upward facing sensor is exposed may extend the life of the upward facing sensor.

In one aspect, the present system provides a luminaire 3D sensor clip system, comprising: a sensor housing having a light receiving opening and one or more bottom openings; an upward facing sensor such as a color sensor within the housing and aligned with the light receiving opening in the housing such that light from a luminaire is directly received by the color sensor; an environment sensor mounted on one of the bottom openings of the sensor housing in a position such that light from the luminaire is not directed towards the environment sensor; a sectorized VLC/DLC receiver for receiving visual light transmissions; a magnetometer 3D sensor/orientation sensor to identify the orientation of the sectorized VLC/DLC receiver; and, an attachment mechanism which may include adjustable vertical and horizontal attachment members for connecting the 3D sensor clip onto luminaires of various shapes and sizes. The environment sensor may be a low resolution imaging sensor, such as an array of sensors combined into a low resolution imaging device, or a single ASIC that is an imaging sensor being arranged to monitor the environment of the light source, an ambient light sensor, and a temperature sensor, for example.

In some aspects of the exemplary disclosed embodiments of a 3D sensor clip, an attenuation chamber is included for reducing high lux/lumen values of the light emitted by the luminaire, before the light reaches the color sensor, by reflecting the light off the interior surface of the attenuation chamber. Additionally, a reflective material such as a mirror can be used to reflect light received into the light receiving opening directly towards the color sensor. The attenuation chamber may have a fixed or variable width. Optionally, a dampening and filtering screen can be positioned between the light receiving opening in the housing and the color sensor to remove certain types or amounts/intensities of light before the light is received by the color sensor.

The disclosure also includes exemplary embodiments of a method to attenuate high luminous intensities of light coming out of a plurality of luminaires using an exemplary 3D sensor clip assembly as disclosed with respect to the use of the 3D sensor clip assembly.

The disclosure also includes exemplary embodiments of a method for automated identification and location of luminaires using an exemplary system including sensors as disclosed with respect to the operation of the system.

These and other advantages will be apparent from the exemplary disclosed embodiments. The preceding is a summary to provide an understanding of some aspects of exemplary embodiments of the disclosure. This summary is neither an extensive nor exhaustive overview of the disclosure and its various embodiments.

BRIEF DESCRIPTION OF THE FIGURES

A more particular description will be rendered by reference to specific exemplary embodiments thereof that are illustrated in the appended drawings. Understanding that these drawings depict only typical exemplary embodiments thereof and are not therefore to be considered to be limiting of its scope, exemplary embodiments will be described and explained with additional specificity and detail through the use of the accompanying drawings in which:

FIG. 3H illustrates exemplary embodiment of a generally ball-shaped sectorized VLC/DLC directional receiver with a slice removed according to the disclosure;

Figure 1:
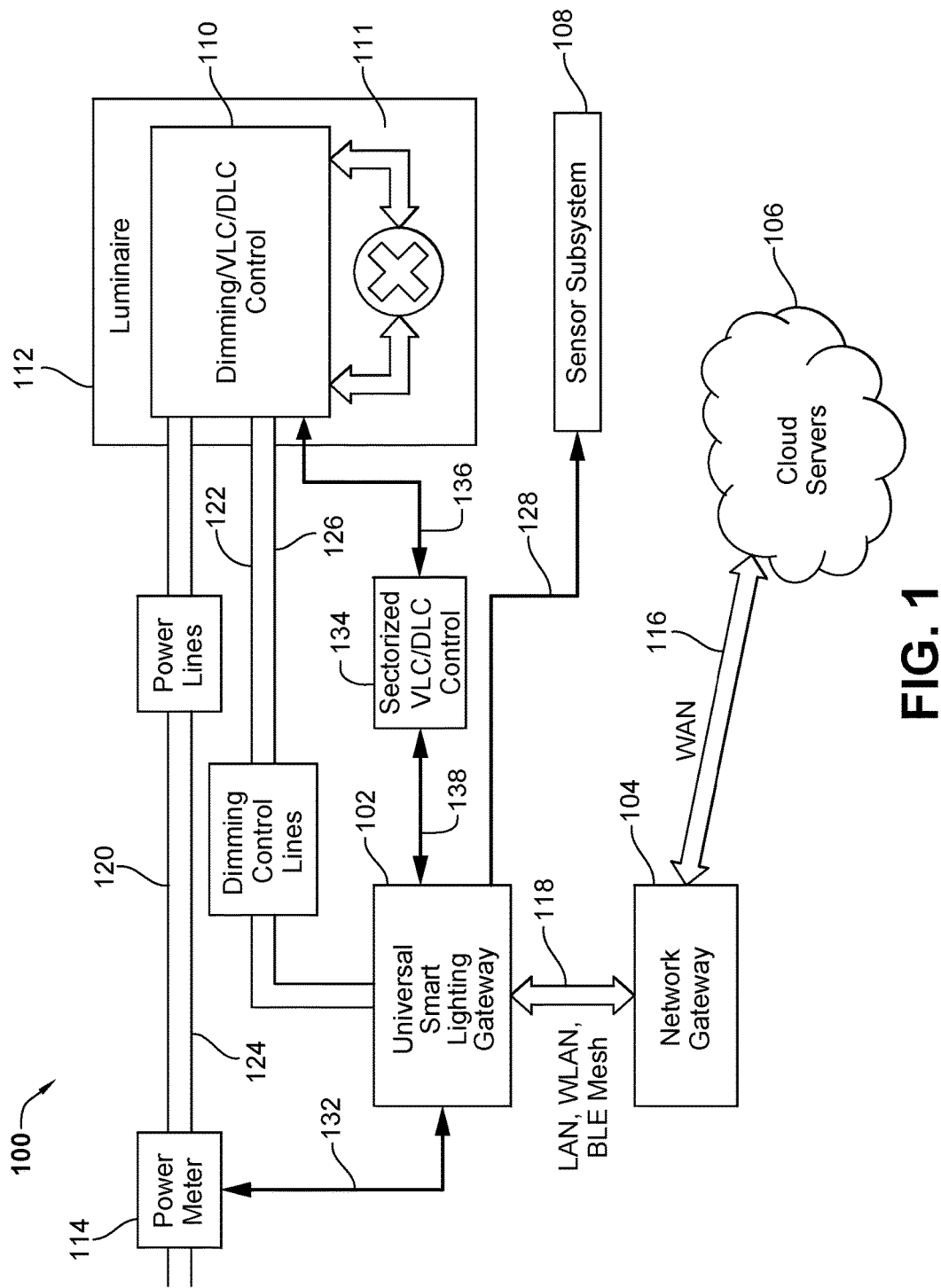
FIG. 1 illustrates a high-level diagram of an exemplary system for use with an exemplary three-dimensional (3D) sensor clip according to the disclosure.

Various features, aspects, and advantages of the exemplary embodiments will become more apparent from the following detailed description, along with the accompanying figures in which like numerals represent like components throughout the figures and text. The various described features are not necessarily drawn to scale, but are drawn to emphasize specific features relevant to some embodiments.

DETAILED DESCRIPTION

Reference will now be made in detail to various exemplary embodiments. Each example is provided by way of explanation, and is not meant as a limitation and does not constitute a definition of all possible embodiments. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, NVRAM or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Exemplary disclosed connections such as data connections, electrical connections, control connections, or other pairings between disclosed components may be known wired or wireless connections consistent with this disclosure.

FIG. 1 depicts an exemplary embodiment of a lighting control system 100. The system 100 includes, among other things, at least one gateway 102—which may be a Universal Smart Lighting Gateway (USLG) gateway in the exemplary embodiment—at least one luminaire 112 with an associated LED 111 light source, and a dimming/VLC/DLC control 110. The exemplary system 100 may include a single luminaire or multiple luminaires 112 connected with a single common interface to power lines 120, 124 that connect the luminaire 112 to a power meter 114 and dimming control lines 122, 126 that connect the dimming/VLC/DLC control 110 to the gateway 102. The power meter 114 is connected electrically between the gateway 102 and the luminaire 112 and is connected electrically to the gateway 102 via the power meter interface 132.

In the exemplary embodiment shown in FIG. 1, the dimming/VLC/DLC control 110 controls the dimming level of the luminaire 112 based on instructions from the gateway 102, which receives scheduling and dimming control instructions from a server which may be one or more cloud servers 106 as shown in FIG. 1. In the same or other embodiments, servers may include local servers, networked servers, hosted servers, or any other server consistent with this disclosure. The dimming VLC/DLC Control 110 device interface is connected to the gateway 102 by either a wired or wireless connection. For example, the dimming VLC/DLC Control 110 is typically a two-wire or a four-wire connection when a luminaire 112 is color-temperature control enabled. A sectorized VLC/DLC control 134 connects to the luminaire 112 and dimming VLC/DLC Control 110 via connection 136, and to the gateway 102 via connection 138.

The gateway 102 is further connected to a sensor subsystem 108 via sensor interface 128 (which may be a wired or a wireless connection) configured to communicate, coordinate, and receive and transfer information between the sensor subsystem 108 and gateway 102, and/or ultimately to the cloud server 106 via the gateway 102. The exemplary sensor subsystem 108 may also communicate directly with cloud server 106 through known physical or wireless connections consistent with this disclosure. In the exemplary embodiment shown in FIG. 1, the sensor subsystem 108 communicates with the gateway 102 via sensor interface 128, and/or ultimately to the cloud server 106 via the gateway 102 and a backhaul interface 118 described further below. On the other hand, the cloud server 106 may send information such as testing/measurement schedules and expected ranges for measurements to the sensor subsystem 108 via the backhaul interface 118/gateway 102 and sensor interface 128. The disclosure does not limit the type of hardware/wire/bus interfaces between the gateway 102 and the sensor subsystem 108; e.g., the number of wires, the type of wires or bus connectors, or the wireless data protocol comprising the sensor interface 128. The connections can be as simple as analog interface connectors and/or electrical/digital bus connectors of any kind.

The exemplary system 100 also includes the backhaul interface 118 connected to the gateway 102 and a network gateway 104. The backhaul interface 118 may be a wired or wireless Local Area Network (LAN), including one or more of Mesh Bluetooth Low Energy (Mesh BLE), Smart Mesh, Bluetooth Mesh, WLAN, ZigBee, and/or Ethernet LAN. The backhaul interface 118 and the communication protocol may be any known communication protocol consistent with this disclosure. In an exemplary embodiment this interface is Mesh BLE. According to an aspect, the gateway 102 is connected with the network gateway 104 which resides between the local networks to the gateway 102 and, for example, a wide area network (WAN) 116 connecting the network gateway 104 to the cloud servers 106. The backhaul interface 118, including the WAN 116 that ultimately connects the gateway 102 to cloud servers 106, is the exemplary route for information to travel in both directions between the gateway 102 and the cloud servers 106. In the exemplary embodiment shown in FIG. 1, the gateway 102 provides to the cloud servers 106 information such as, without limitation, measurements from the sensor subsystem 108 including orientation and/or position of the exemplary disclosed three-dimensional (3D) sensor clips (308, FIGS. 3A-3C), the dimming level of the luminaire 112, information from the sectorized VLC/DLC control 134, etc. The cloud server(s) 106 provide the gateway 102 with the management and control information that the gateway 102 will use to set dimming levels of the luminaire 112/LED 111, testing schedules for the sensor subsystem 108, control for VLC transmissions, etc.

Figure 2:
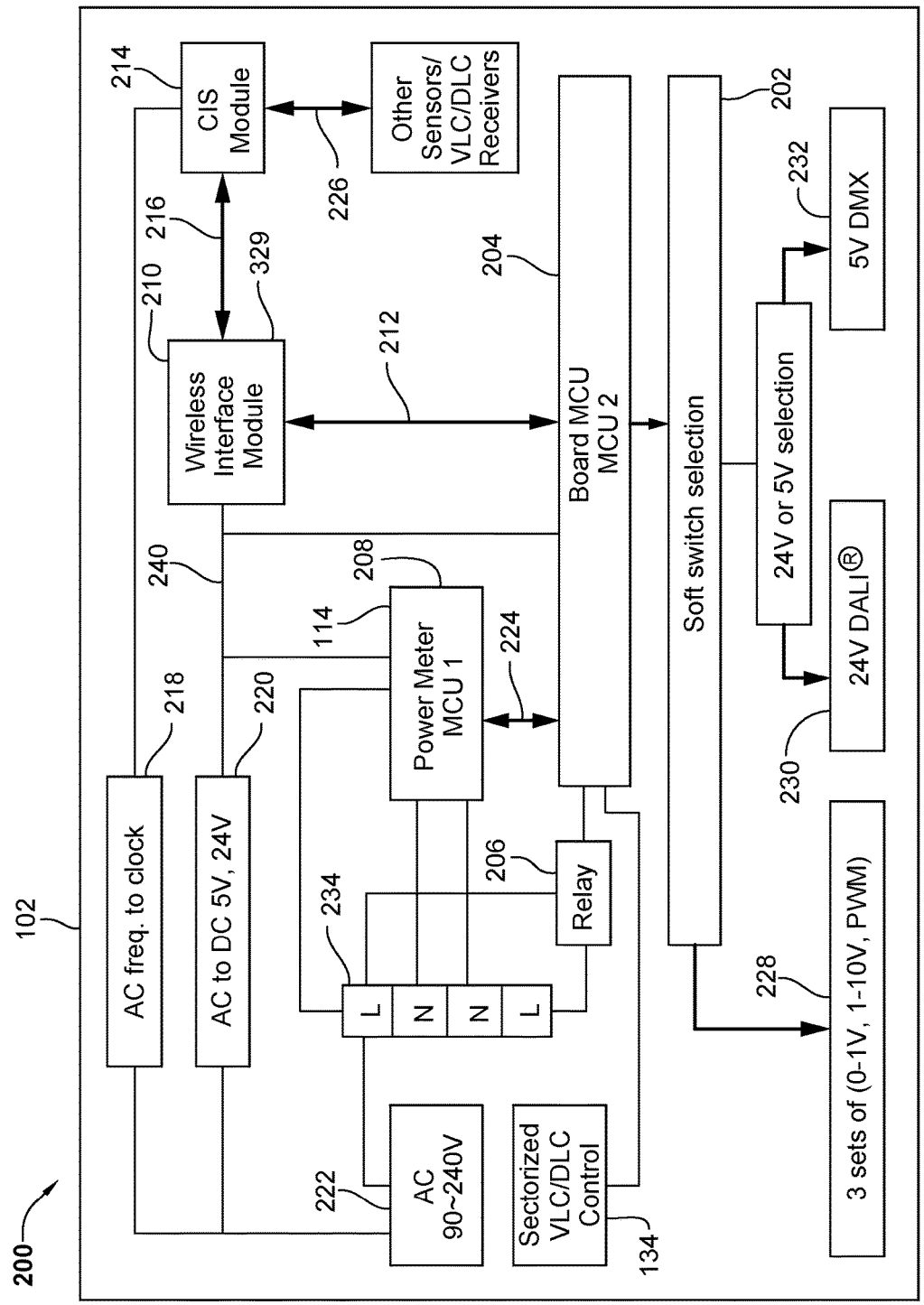
FIG. 2 illustrates an exemplary gateway box diagram for use with the exemplary system according to the disclosure.

FIG. 2 depicts an exemplary gateway box system 200 including the gateway 102, one or more Camera Interface System (CIS) modules 214, and sensor communications 216. A soft switch 202 to select between different electrical dimming interfaces 228, 230, 232 is provided. The soft switch 202 may be used to search for the correct dimming protocol between the gateway 102 and the luminaire 112. In other embodiments the dimming control protocol is done via a hard switch. The luminaire 112 may be a dimming luminaire 112 in which case the protocol modules 228, 230, and 232 are the software implementation of the dimming interfaces that reside in the gateway 102. The supported dimming protocol includes several sets of protocols, such as, for example, 0V-10V, 1V-10V, Pulse Width Modulation (PWM) 228, protocols over 0V-10V and/or 1V to 10V, a 24V DALI® 230 protocol, and a 5V Digital Multiplex (DMX) 232 protocol. The protocols may each include algorithms, which may be implemented in a Micro Controller Unit 2 (MCU-2) 204. For purposes of this disclosure, "protocol" means generally, for example and without limitation, one or more actions or series or sets of actions, functions, or operations.

The MCU-2 204 is powered by an AC to DC 5V, 24V power module 220 via a power line connection 240. MCU-2 204 may also be connected to a power meter 114 via a Micro Controller Unit 1 e.g., MCU-1 and a Universal Asynchronous Receiver/Transmitter (UART) 224. The MCU-2 204 is also connected to a Relay 206. MCU-2 204 may also be connected to a Wireless Interface Module (WIM) 210 via a Serial Peripheral Interface (SPI) bus 212. According to an aspect, MCU-2 204 is also connected to the sectorized VLC/DLC control 134, where the information is relayed to the MCU-2 204. In an embodiment, the MCU-2 204 also controls the Relay 206, which may be designed to cut off/block the current to the luminaire 112 upon a decision by the MCU-2 204. The power cutoff can be used to disconnect power from the controlled luminaire subsystem (see, for example, FIG. 1). The WIM 210 is implemented as Bluetooth Low Power/Energy (BLE) device that uses the Mesh BLE protocol to connect with other devices, as well as having the SPI bus 212 and an Inter-Integrated Circuit Two-Wire Serial Interface bus (TWSI) 216. The WIM 210 may be connected to a sensor subsystem that may include the CIS module 214, which may include, for example and without limitation, an environment sensor and a Red, Green, Blue (RGB) color sensor combination device. The CIS module 214 can be extended via a second TWSI bus 226 with other sensor modules or VLC/DLC receivers. The CIS module 214 may require a clock, which is received via an AC Frequency to a clock module interface 218. The WIM 210 may require power, which is typically received via the AC to DC 5V, 24V power module 220 via the power interface line 240. An AC Power 90V-240V power module 222 is relayed to the MCU-2 204 via a Line Control (LNNL) 234, and relayed from the MCU-2 204 to the soft switch 202 for power selection for the dimming protocol interfaces. The AC Power module 222 may also be relayed to the power meter 114 via the LNNL 234, which measures all power delivered to the luminaire 112. The LNNL 234 illustrated in FIG. 2 may provide the physical electrical line connections.

Figure 3A:
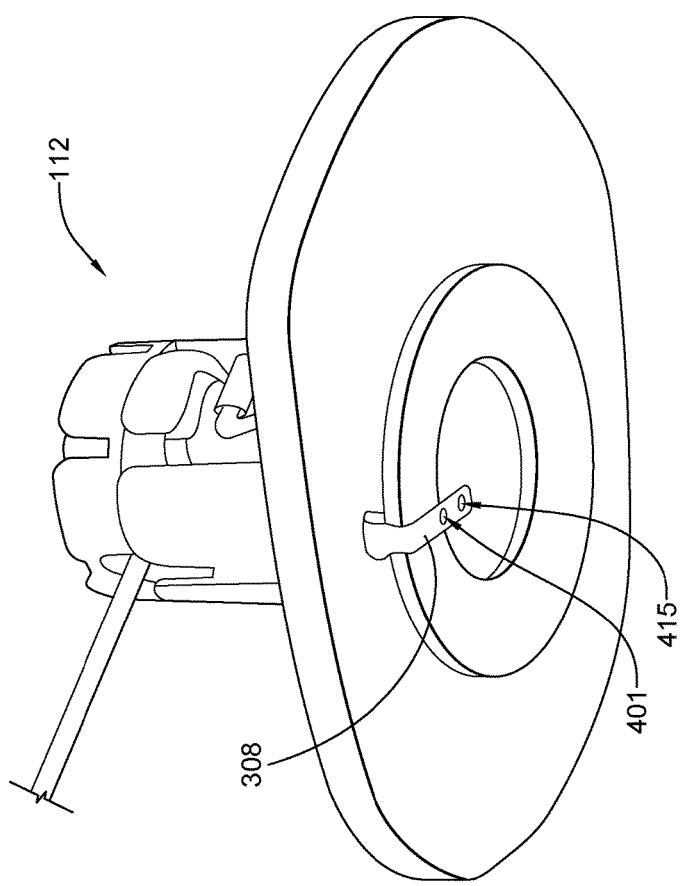
FIG. 3A illustrates an exemplary 3D sensor clip attached to a circular luminaire according to the disclosure.
Figure 3B:
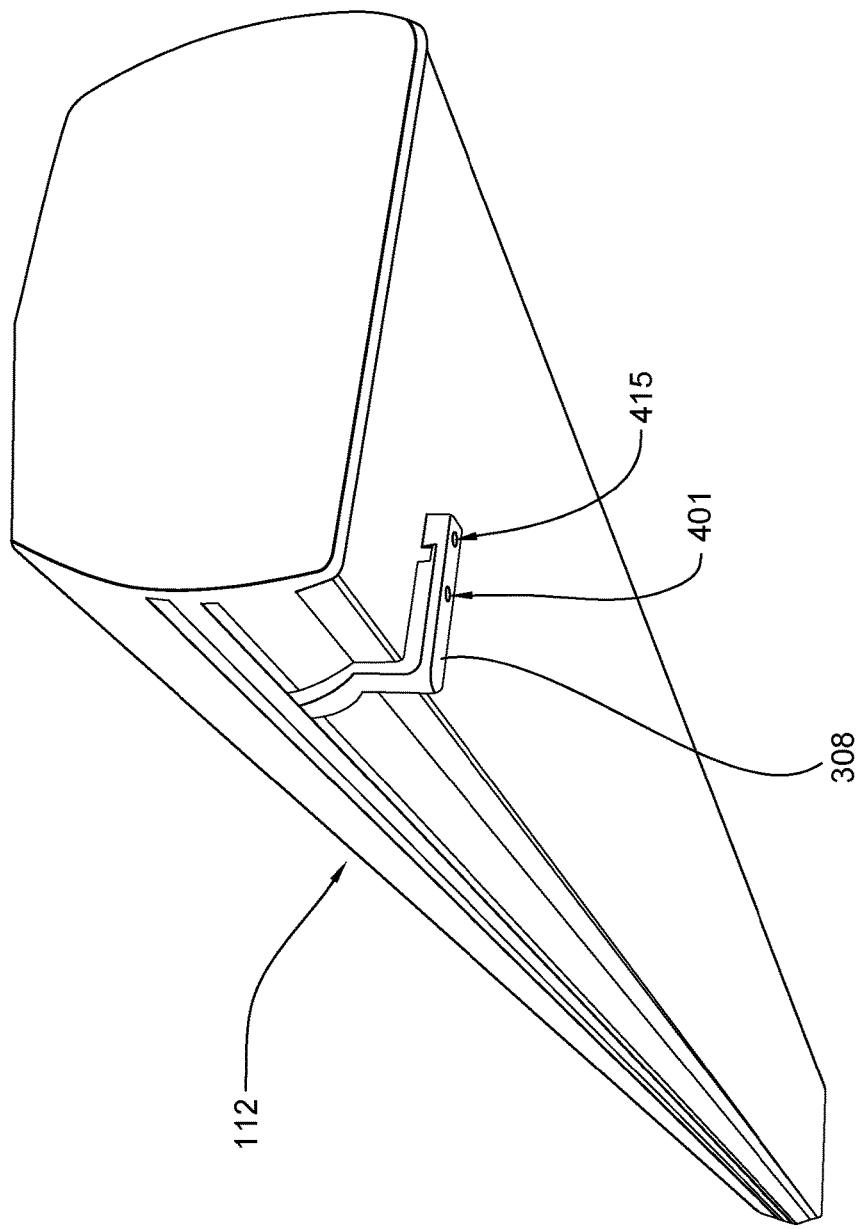
FIG. 3B illustrates an exemplary 3D sensor clip attached to a linear luminaire according to the disclosure.
Figure 3C:
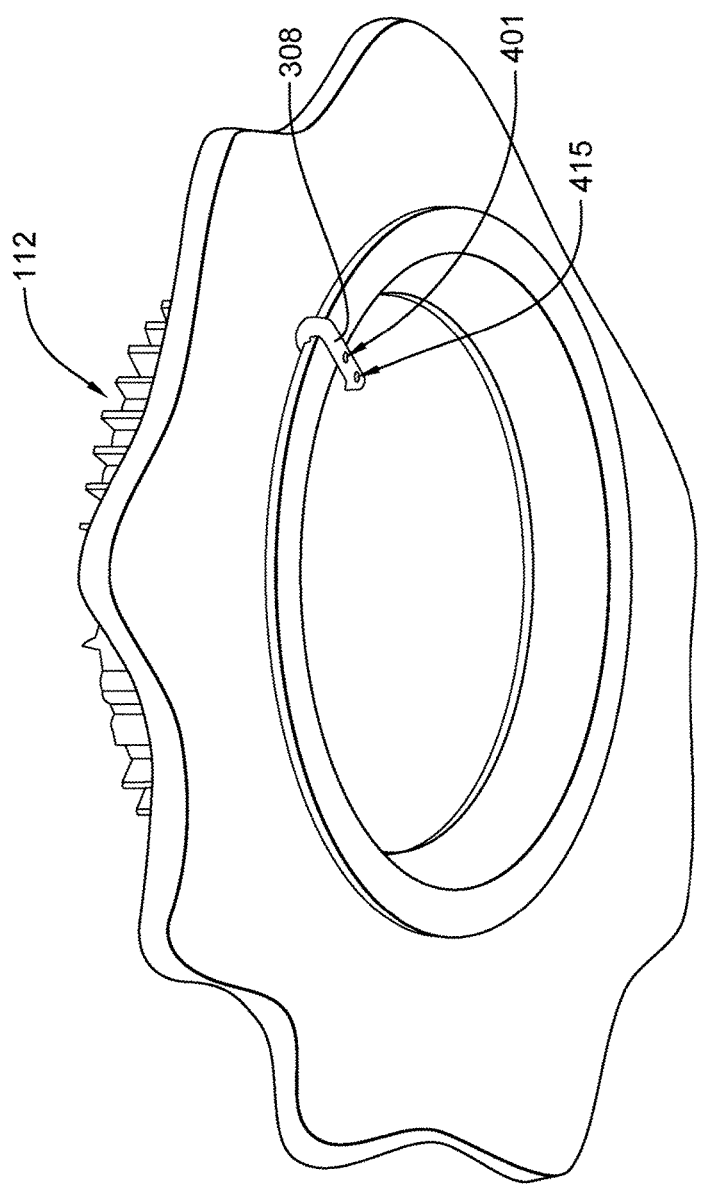
FIG. 3C illustrates an exemplary 3D sensor clip attached to another circular luminaire according to the disclosure.
Figure 3D:
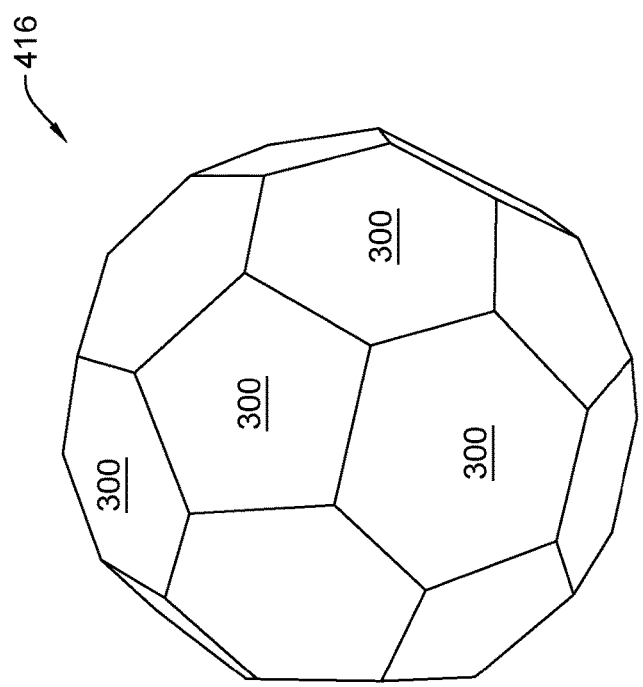
FIG. 3D illustrates an exemplary, generally ball-shaped sectorized VLC/DLC directional receiver for use according to the disclosure.
Figure 3E:
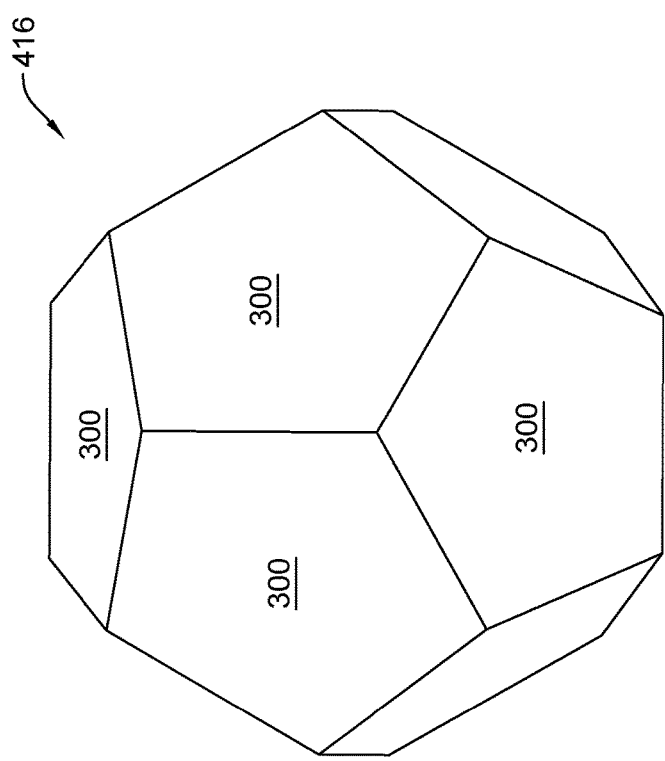
FIG. 3E illustrates an alternative exemplary embodiment of a generally ball-shaped sectorized VLC/DLC directional receiver according to the disclosure.
Figure 3F:
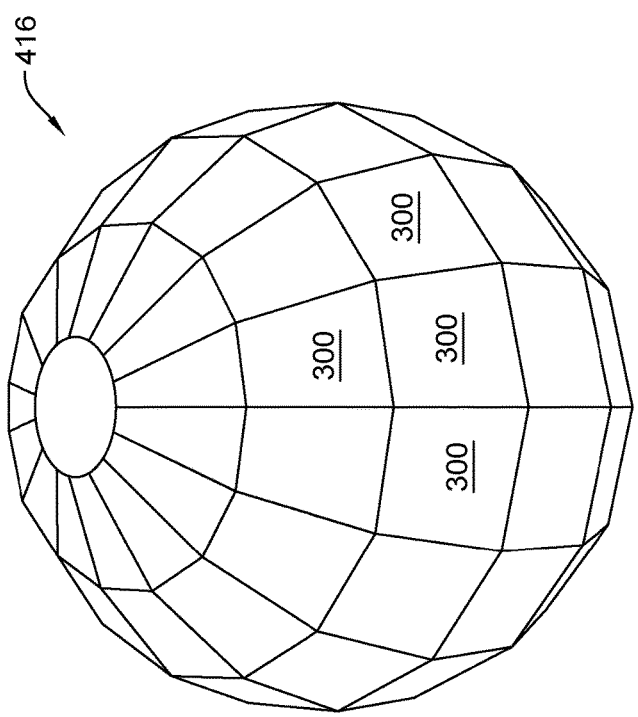
FIG. 3F illustrates another alternative exemplary embodiment of a generally ball-shaped sectorized VLC/DLC directional receiver according to the disclosure.
Figure 3G:
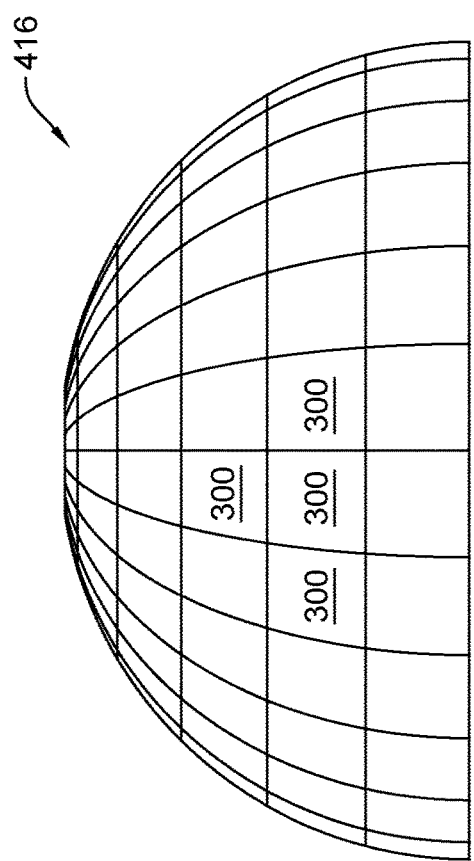
FIG. 3G illustrates an exemplary, generally hemispherically-shaped embodiment of a sectorized VLC/DLC directional receiver according to the disclosure.

With reference now to FIGS. 3A-3C, exemplary embodiments of a 3D sensor clip 308 are disclosed. The exemplary 3D sensor clips 308 include at least the sensor subsystem 108 and a sectorized VLC/DLC receiver (416, FIGS. 4A-5B) (not shown in FIGS. 3A-3C) and are configured to adjustably attach to luminaires 112 having different shapes and sizes. For example, in FIG. 3A the exemplary 3D sensor clip 308 is attached to a luminaire 112 with a circular opening. In FIG. 3B the luminaire 112 is linear and in FIG. 3C the luminaire 112 has a circular opening that is apparently larger than the opening of the luminaire 112 shown in FIG. 3A. The adjustability of the exemplary disclosed 3D sensor clips 308 is discussed with respect to FIGS. 4A-10.

With continuing reference to FIGS. 3A-3C, the exemplary 3D sensor clips 308 each include two openings 401, 415 configured to respectively receive a downward facing sensor and the sectorized VLC/DLC receiver. The downward facing sensor (412, FIGS. 4A-5B) is an environment sensor that is part of the sensor subsystem 108 and may be, for example and without limitation, a temperature sensor, motion sensor, ambient light sensor, footfall sensor, etc. The sectorized VLC/DLC receiver is configured to receive visual light transmissions from a transmitting luminaire as part of the exemplary disclosed embodiments for identifying and/or determining a direction and distance of the transmitting luminaire relative to the sectorized VLC/DLC receiver.

The exemplary 3D sensor clip 308 also includes an orientation sensor such as a magnetometer 3D sensor/orientation sensor (not shown) for determining the orientation and/or position of the 3D sensor clip 308 and ultimately the sectorized VLC/DLC receiver. The orientation of the sectorized VLC/DLC receiver must be known to determine the proper direction to a transmitting luminaire from which light is received at the sectorized VLC/DLC receiver. In certain exemplary disclosed embodiments, the magnetometer 3D sensor/orientation sensor is embedded within or attached or integrated within any part of the 3D sensor clip 308. In other exemplary disclosed embodiments the magnetometer 3D sensor/orientation sensor is part of or integrated within the sectorized VLC/DLC receiver as discussed with respect to FIGS. 3D-3H. The magnetometer 3D sensor/orientation sensor provides the gateway 102 and/or cloud servers 106 with the orientation of the sectorized VLC/DLC sensor clip 308 either directly or by providing the orientation of the 3D sensor clip 308 and thereby the sectorized VLC/DLC receiver from a known orientation on the 3D sensor clip 308. The orientation sensor is not limited to a magnetometer 3D sensor—other known orientation sensors besides magnetometer 3D sensors may be used in accordance with this disclosure.

In other exemplary embodiments of a 3D sensor clip 308 in accordance with the disclosure, the environment sensor is integrated with the sectorized VLC/DLC receiver as discussed with respect to FIGS. 3D-3H. In that case, only one downward facing opening on the 3D sensor clip 308 is required for the combined environment sensor/sectorized VLC/DLC receiver. The openings 401, 415 on the exemplary 3D sensor clips 308 shown in FIGS. 3A-3C are downward facing with respect to the luminaire 112 and face in an opposite direction (i.e., oriented at an approximately 180-degree angle) to the direction of an upward facing sensor (410) as discussed further below. In other embodiments, the openings 401, 415 may face in any direction consistent with this disclosure and generally not in the direct line of light emitted by the luminaire 112. For purposes of this disclosure, openings, sensors, and/or components that are configured to face away from a luminaire and/or the direct light emitted by a luminaire are generally referred to as downward facing. Further, any number of such downward facing openings, sensors, and/or components may be provided on a 3D sensor clip 308 consistent with this disclosure.

With reference now to FIGS. 3D-3H, several exemplary embodiments of a sectorized VLC/DLC receiver 416 are shown. For purposes of this disclosure, "sectorized" generally means without limitation comprising a variety of facets 300 (i.e., surfaces or faces) configured at different angles to each other. As explained further below, the facets 300 are, in the exemplary disclosed embodiments, surface sensors containing pixels for detecting visual light transmissions. The exemplary embodiments shown in FIGS. 3D-3H include sectorized VLC/DLC receivers 416 having various geometries and numbers and sizes of facets 300. In other embodiments, a sectorized VLC/DLC receiver may have any geometry or number of facets 300 consistent with this disclosure.

Further, in certain exemplary disclosed embodiments, one or more downward facing facets 300 on the bottom of a sectorized VLC/DLC receiver 416 may comprise one or more environment sensors, to consolidate the environment sensor and the sectorized VLC/DLC receiver 416 on the 3D sensor clip 308. In the same or other embodiments, a portion 310 of the sectorized VLC/DLC receiver 416 may be removed such as in FIG. 3H, to make a larger space 320 for accommodating, for example, environment sensors that are larger than the particular facets 300 of that sectorized VLC/DLC receiver 416. According to the exemplary disclosed embodiments of a 3D sensor clip 308, the sectorized VLC/DLC receiver 416 with integrated environment sensor would be installed on the 3D sensor clip 308 such that the environment sensor and VLC/DLC receiver 416 are downward facing at an approximately 180-degree angle to the upward facing sensor (410) described further below.

In the same or other embodiments, one or more facets 300 of a sectorized VLC/DLC receiver 416 may comprise an orientation sensor such as a magnetometer 3D sensor/orientation sensor. Alternatively, an orientation sensor such as a magnetometer 3D sensor/orientation sensor may be integrated within the sectorized VLC/DLC receiver 416 or attached to an external portion of the sectorized VLC/DLC receiver 416. In such embodiments, the orientation sensor may communicate the orientation of the sectorized VLC/DLC receiver 416 itself, as opposed to the 3D sensor clip 308, to the gateway 102 and/or cloud servers 106.

In the exemplary disclosed devices, systems, and methods, the sectorized VLC/DLC receiver 416 is configured to receive visual light transmitted by a transmitting luminaire. The transmission of light from the transmitting luminaire is controlled by the gateway 102 that directs the particular (transmitting) luminaire. The transmission may be the same transmission of light that is used to illuminate the environment in which the transmitting luminaire is installed. Alternatively, the transmission may be a pattern that represents a unique identification code for the particular luminaire. In other aspects, the transmission may involve different dimming levels to represent different transmission ranges. The nature of the transmission is not limited by the disclosure.

In the exemplary disclosed embodiments, the transmitted visual light is received by a sectorized VLC/DLC receiver 416 on a 3D sensor clip 308 attached to a different luminaire 112 than the transmitting luminaire. In other embodiments or applications, the sectorized VLC/DLC receiver 416 need not be attached to a 3D sensor clip 308 or luminaire 112 but may be mounted anywhere and in any fashion for a particular application. The transmitted visual light is detected by pixels contained in the facets 300 of the sectorized VLC/DLC receiver 416 and, in particular, in the one or more facets 300 on which the visual light impacts the sectorized VLC/DLC receiver 416. Information such as, for example and without limitation, the intensity, direction, pattern, and color of the received light, and the orientation of the sectorized VLC/DLC receiver 416, is communicated to the cloud servers 106 via gateway 102. The cloud servers 106 are configured to use the information to determine, among other things, the identity of the transmitting luminaire and the distance and direction of the transmitting luminaire relative to the sectorized VLC/DLC receiver 416. For example, in the exemplary disclosed embodiments the sectorized VLC/DLC receiver 416 has a particular orientation relative to the environment or the 3D sensor clip 308 such that each facet 300 of the sectorized VLC/DLC receiver 416 faces a particular direction. The orientation of the 3D sensor clip 308 and/or sectorized VLC/DLC receiver 416, and thereby the direction in which each facet 300 of the sectorized VLC/DLC receiver 416 faces, is known from an orientation sensor such as a magnetometer 3D sensor/orientation sensor as part of the sensor subsystem 108 in the exemplary disclosed embodiments. The magnetometer 3D sensor/orientation sensor transmits the orientation of the sectorized VLC/DLC receiver 416 to the at least one cloud server 106 via the gateway 102. Thus, the direction and angle of each facet 300 is known and the amount of light received at any facet 300 may be correlated with the actual light emission from, and direction to, the transmitting luminaire.

In another aspect, the orientation sensor such as the magnetometer 3D sensor/orientation sensor is set in a specific orientation relative to the 3D sensor clip 308 and/or the sectorized VLC/DLC receiver 416 at the manufacturing site. For example, the magnetometer 3D sensor/orientation sensor may be positioned in a downward facing opening or groove in the 3D sensor clip 308 in which it may fit in only one specific way relative to the sectorized VLC/DLC receiver 416 on the 3D sensor clip 308. Thus, according to this aspect, the system 100 including the gateway 102 and cloud servers 106 may be configured to determine the orientation of the sectorized VLC/DLC receiver 416 relative to the magnetometer 3D sensor/orientation sensor itself.

In another aspect, the sectorized VLC/DLC receiver 416 may be positioned in an opening or a groove (such as 415, FIG. 4A-4B) into which it slots in only a specific way. In this aspect, the system 100 including the gateway 102 and cloud servers 106 may be configured to determine the orientation of the sectorized VLC/DLC receiver 416 from the orientation of the 3D sensor clip 308, which orientation may be provided by, e.g., an orientation sensor such as a magnetometer 3D sensor/orientation sensor.

Figure 4A:
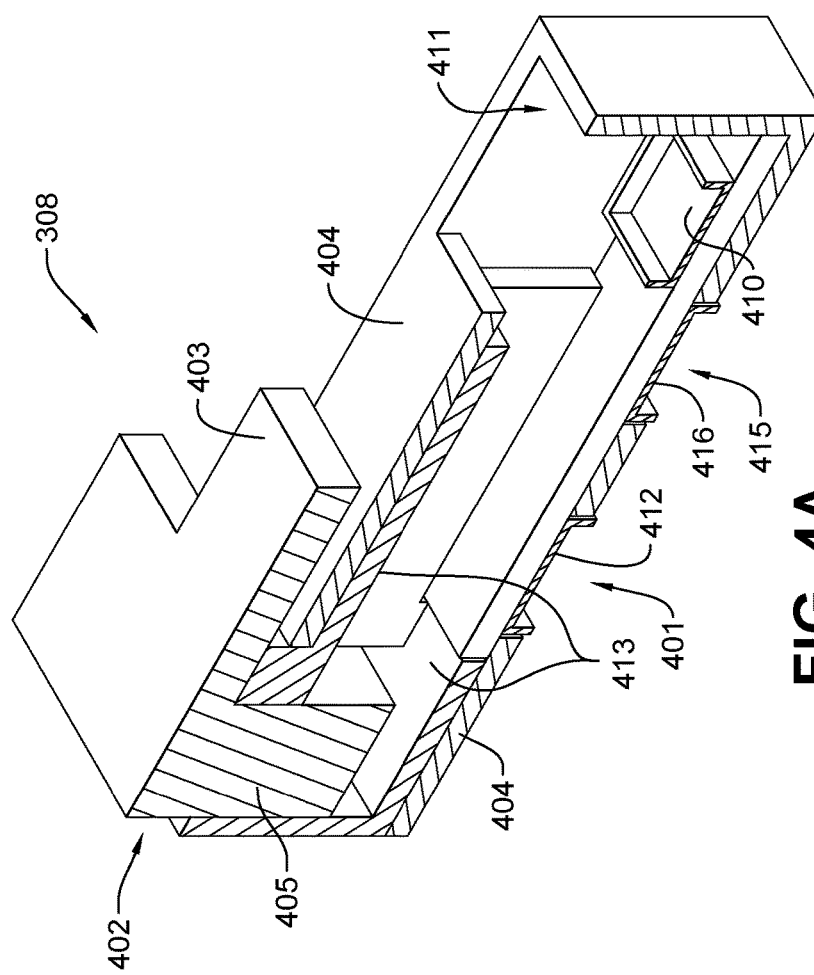
FIG. 4A illustrates a top perspective cross-sectional view of an exemplary sensor clip in a minimum dimensional configuration.
Figure 4B:
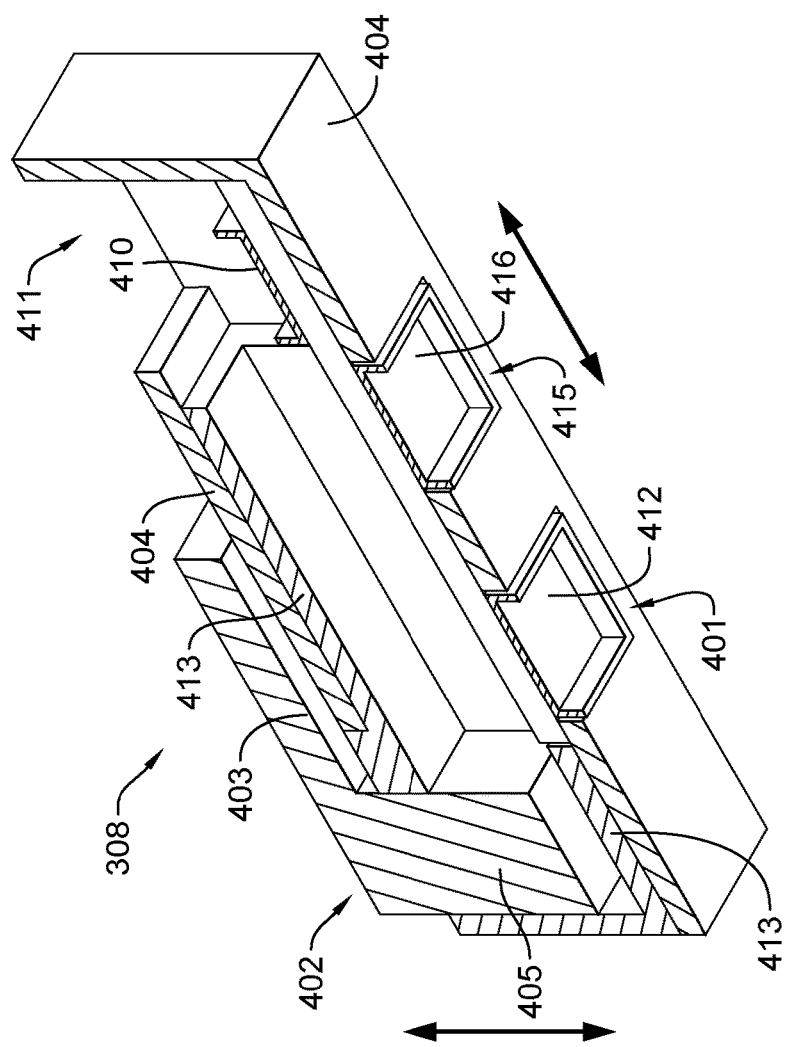
FIG. 4B illustrates a bottom perspective cross-sectional view of the exemplary sensor clip of FIG. 4A.
Figure 4C:
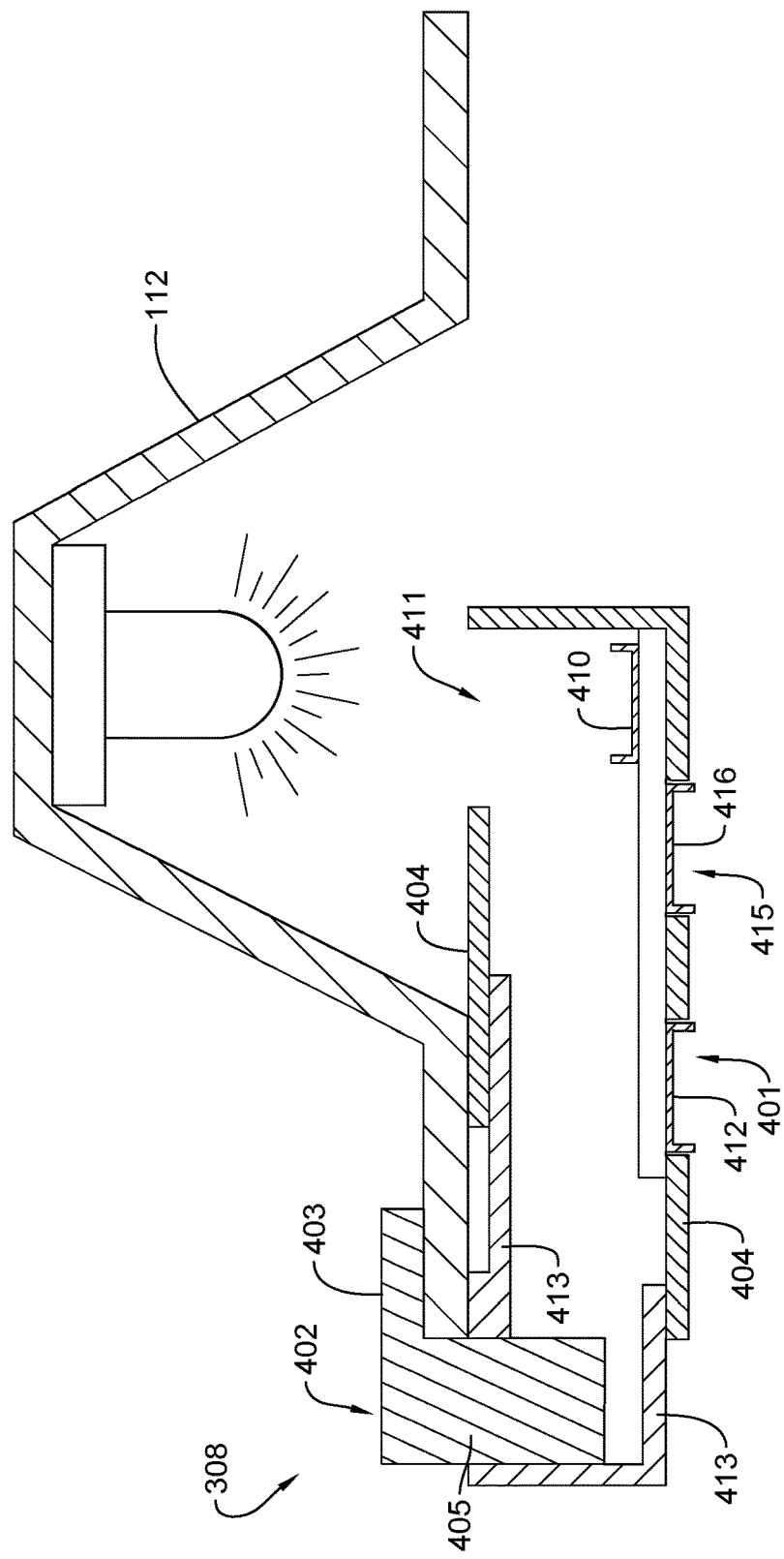
FIG. 4C is a cross-sectional side view of the exemplary sensor clip of FIGS. 4A and 4B in an expanded dimensional configuration and secured to the rim of a luminaire.

With reference now to FIGS. 4A and 4B, top and bottom cross-sectional perspectives of an exemplary 3D sensor clip 308 according to the disclosure are shown. The 3D sensor clip 308 includes, among other things, a sensor housing 404 that forms a general framework for the 3D sensor clip 308 and components including an attachment member 402 which includes an attachment arm 403 configured for attachment to a luminaire (as shown in FIG. 4C) and a vertical leg 405 extending at a right angle to the attachment arm 403. A sliding member 413 is configured to slidingly receive the vertical leg 405 of the attachment member 402 such that the sliding member 413 and vertical leg 405/attachment member 402 are configured to slide vertically relative to each other along a length of the vertical leg 405 (as shown and described with respect to FIGS. 5A and 5B). In addition, the sensor housing 404 is configured to silidingly receive sliding member 413 such that the sensor housing 404 slides telescopically horizontally relative to the sliding member 413.

The exemplary 3D sensor clip 308 in FIGS. 4A and 4B is shown in a minimum dimensional configuration which is a fully compressed position state in which the movable/adjustable parts discussed above are in a position that minimizes the overall dimensions of the 3D sensor clip 308. The exemplary 3D sensor clips 308 also have various expanded dimensional configurations through which the movable/adjustable parts may move to vary the dimensions and configuration of the 3D sensor clip 308 (see, e.g., FIGS. 4C, 5A-5B). The adjustable nature of the exemplary 3D sensor clip 308 allows the 3D sensor clip 308 to adapt and connect to luminaires 112 having different shapes and sizes. In other embodiments, the sensor housing 404 and associated components may be variously configured in a number of shapes, such as cylindrically-shaped, polygonally-shaped, cube-shaped, or any other shape consistent with this disclosure.

With reference now to FIG. 4C, and continuing reference to FIGS. 4A and 4B, one example is shown of how the exemplary 3D sensor clip 308 may be configured such that the sensor housing 404 and vertical leg 405 are expanded to bring a top, light receiving opening 411 in the sensor housing 404 within the direct light emission from the luminaire 112 when the attachment arm 403 is attached to a lip of the luminaire 112. In other examples and with other luminaires, the exemplary 3D sensor clip 308 may be configured according to the needs of a particular application. In the exemplary configuration shown in FIG. 4C, at least one upward facing sensor 410 as part of the sensor subsystem 108 is aligned with the top opening 411 such that the upward facing sensor 410 receives direct light from the luminaire 112. The upward facing sensor 410 generally faces in an opposite direction (i.e., with faces/views directed at an approximately 180-degree angle) to the downward facing environment sensor 412 and/or sectorized VLC/DLC receiver in openings 401, 415 in the exemplary embodiment (s) shown in FIGS. 4A-4C. In an alternative exemplary embodiment (not shown), the downward facing environment sensor 412 may be a bottom, downward facing facet 300 of a sectorized VLC/DLC receiver 416 in opening 415, in which case sensor housing 404 would require only one opening (415) to accommodate both of the environment sensor 412 and the sectorized VLC/DLC receiver 416. In such an embodiment, the upward facing sensor 410 would still face in an opposite direction (i.e., with faces/views directed at an approximately 180-degree angle) to the downward facing environment sensor 412.

In other embodiments in accordance with this disclosure, the upward facing sensor 410 may be oriented in a variety of specific positions configured for exposure to direct light from a luminaire 112, but not necessarily at a 180-degree angle to a downward facing sensor. For purposes of this disclosure, sensors configured for exposure to direct light from a luminaire 112 are generally and without limitation referred to as upward facing sensors.

The upward facing sensor 410 faces upwardly and directly toward the light that the luminaire 112 emits while the environment sensor 412 faces away from or in a downward direction from such light. In the exemplary embodiment shown in FIG. 4C, the upward facing sensor 410 is a "color sensor" capable of measuring multiple color channels of the light that the luminaire 112 emits including the color content and the color intensity of the light. The color sensor can be based on a single color or a plurality of colors. In the exemplary disclosed embodiment, the upward facing color sensor 410 is a Red, Green, Blue (RGB) sensor. In the same or other embodiments, one or more color sensors may be a Yellow, Red, Green, Blue (YRGB) sensor or any color sensor consistent with this disclosure. In an aspect, the color sensor may measure both the color content of a light source and the color intensity of the light source. Different luminaires emit different intensity of light and the upward looking color sensor 410 measures a relative color/light intensity of, e.g., visual light from a transmitting luminaire and communicates the information to the cloud server 106 either directly or via the gateway 102 for processing/correlation with the relative power of the light received at the sectorized VLC/DLC receiver, to determine a relative distance of the transmitting luminaire from the sectorized VLC/DLC receiver. Further, the light intensity data is added to a message (or message stature) that the upward facing color sensor 410 sends as part of its layer two header. According to an aspect, the color sensor 410 or combination of sensors is configured to measure multiple color channels as they directly face the luminaire 112. In addition, the color sensor 410 can be based on a single color or a plurality of colors.

In addition to the upward facing color sensor 410 and the downward facing environment sensor 412, the exemplary embodiment shown in FIGS. 4A-4C includes a sectorized VLC/DLC receiver 416 aligned with the bottom opening 415. The positions of the upward facing color sensor 410, the environment sensor 412, and the sectorized VLC/DLC receiver 416 can be placed at varying levels of direct versus indirect illumination from the luminaire 112 by adjusting the configuration of, e.g., the sensor housing 404, vertical leg 405, and sliding member 413 of the exemplary 3D sensor clip 308.

With continuing reference to FIG. 4C, the attachment arm 403 of the attachment member 402 is received above an edge or lip of the particular luminaire 112, which is positioned between the attachment arm 403 and the sensor housing 404/sliding member 413. Thus, the attachment arm 403 is configured to grasp above the projecting lip of the luminaire 112. The vertical leg 405 extends away from the attachment arm 403 and receives the sliding member 413/sensor housing 404 such that the attachment arm 403 of the attachment member 402 may be positioned above and occupy a space above the luminaire 112 fixture. Thus, the sensor housing 404 and the sliding member 413 extend telescopically to a position in which the upward facing color sensor 410 is directly exposed to the light that the luminaire 112 emits, through opening 411. The position of the upward facing color sensor 410 and the amount of light to which the upward facing color sensor 410 is exposed may be varied by adjusting the distance and direction of the upward facing color sensor 410 into and out of the direct light emission. For example, and with reference to FIG. 4C, sliding the sliding member 413 along the length of vertical leg 405 will lower the sensor housing 404 relative to the luminaire 112 and then the sensor housing 404 slides along the length of sliding member 413 move the upward facing color sensor 410 farther from the luminaire 112 light source. Compressing sensor housing 404 further towards sliding member 413 will move the sensor housing 404 and therefore the upward facing color sensor 410 toward the periphery of the luminaire 112 and farther away from the direct light emission.

Figure 5A:
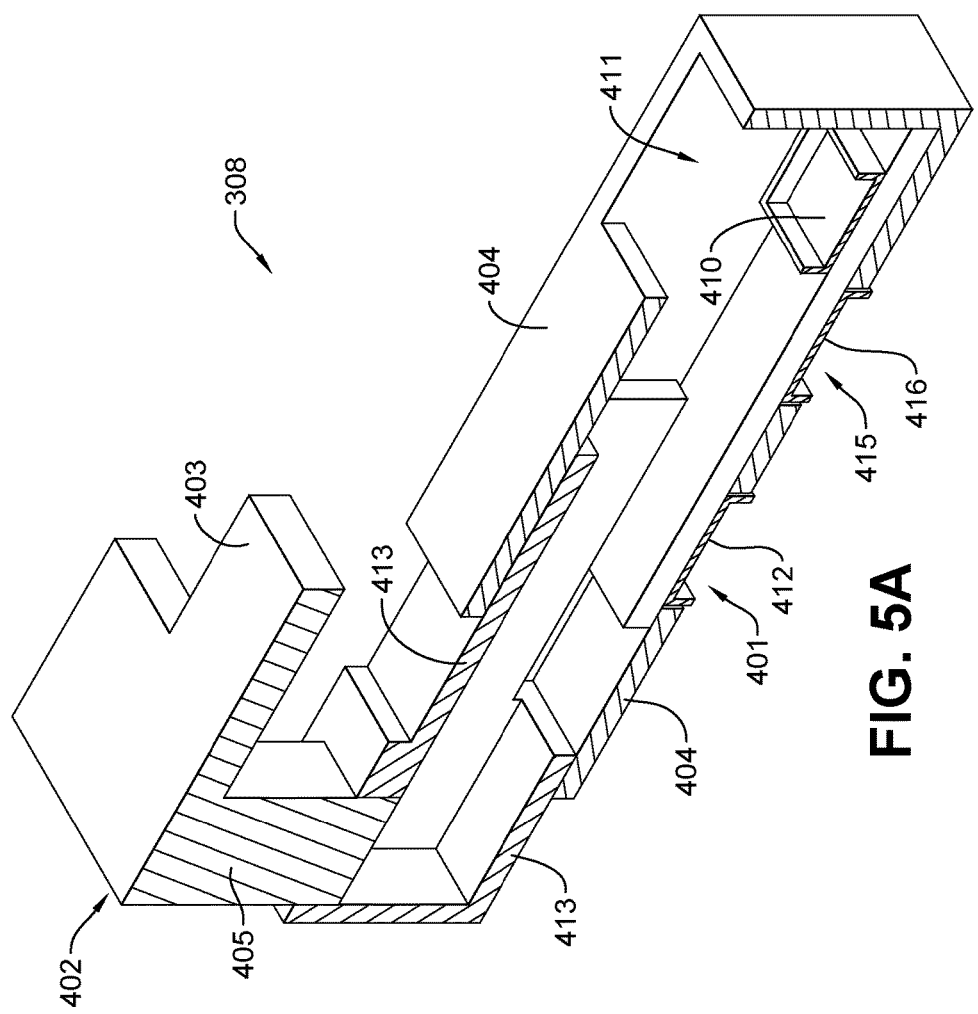
FIG. 5A illustrates a top perspective cross-sectional view of an exemplary sensor clip in an expanded dimensional configuration.
Figure 5B:
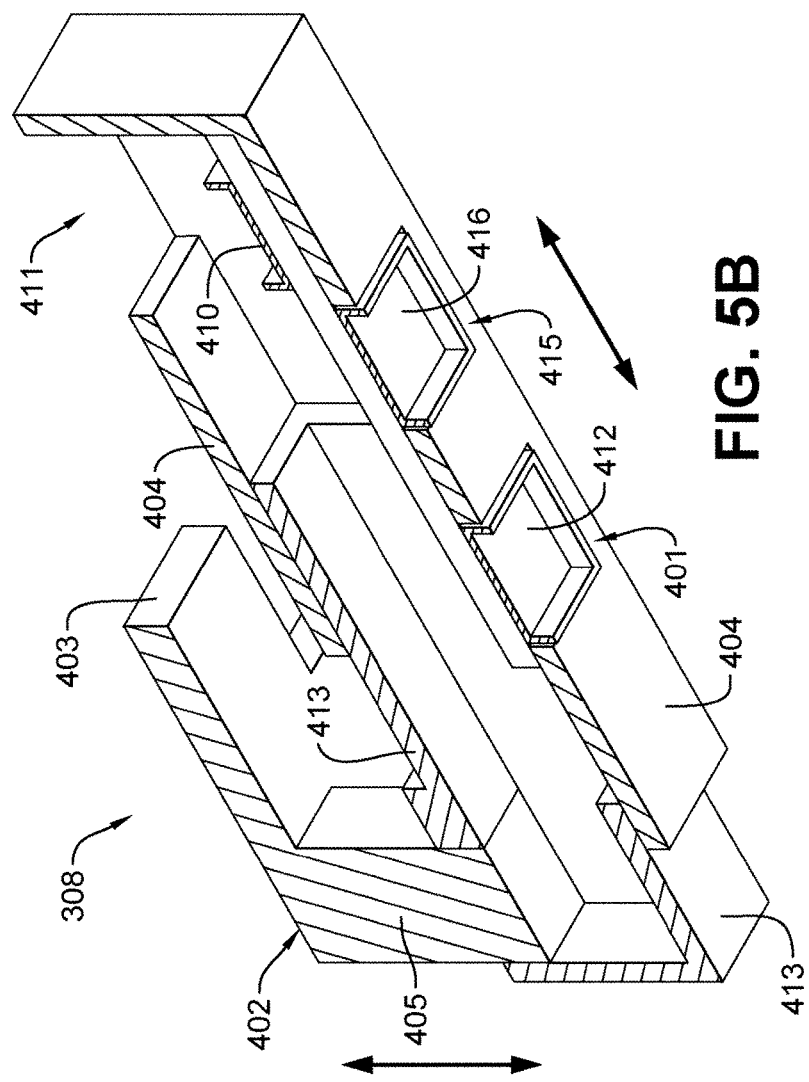
FIG. 5B illustrates a bottom perspective cross-sectional view of the exemplary sensor clip of FIG. 5A.

With reference now to FIGS. 5A and 5B, top and bottom cross-sectional perspectives of an exemplary 3D sensor clip 308 in an expanded dimensional configuration are shown to clarify the adjustable components and nature of the 3D sensor clip 308. In the expanded dimensional configuration, the attachment member 402 is vertically extended relative to sliding member 413 and the sensor housing 404 is extended horizontally relative to sliding member 413. In the exemplary embodiment(s) shown in FIGS. 4A-5B, the sliding member 413 is inserted into an open side of sensor housing 404 on an opposite side of the housing 404 from the upward facing color sensor 410. Alternatively, the sliding member 413 may be configured as a hollow member for receiving the sensor housing 404. The sliding member 413 and sensor housing 404 may be secured generally and at their various extended positions by known, reversible mechanical techniques such as a friction fit, notch and groove, clasp, etc. In addition, the sliding member 413 and attachment member 402/vertical leg 405 may be secured generally and at their various extended positions by those and other known, reversible mechanical techniques.

With continuing reference to FIGS. 4A-5B, sectorized VLC/DLC receiver 416 is mounted on the bottom opening 415 of the sensor housing 404 in the exemplary embodiment(s). The sectorized VLC/DLC receiver 416 may be any one of various geometric shapes (e.g., as in FIGS. 3D-3H) and may include multiple face 3D or semi-3D surface sensors (i.e., facets 300) to receive visual light transmissions from a transmitting luminaire. The surface sensors contain pixels for receiving the visual light transmissions. In an aspect, the sectorized VLC/DLC receiver 416 has an orientation relative to the 3D sensor clip 308 and environment in which the 3D sensor clip 308 is located and each of the facets 300 has a specific direction and angle relative thereto. Accordingly, the amount/intensity of transmitted visual light received at a facet 300 having a specific direction and angle is less than would be actually received if the light was received, e.g., at a surface that was directly perpendicular to the vector of the incoming light. The cloud servers 106 are configured to correlate the amount/intensity of light received at the directions and angles of the facets 300 to a distance and direction of the transmitting luminaire relative to the sectorized VLC/DLC receiver 416. An orientation sensor such as a magnetometer 3D sensor/orientation sensor in the exemplary disclosed embodiments transmits the orientation of the sectorized VLC/DLC receiver 416 (or 3D sensor clip 308 from which the orientation of the sectorized VLC/DLC receiver 416 may be determined) to cloud servers 106. In the event that the orientation sensor is moved vertically and/or horizontally along the movement axes of the vertical leg 405 and sensor housing 404, the direction and angle of the facets 300 on the sectorized VLC/DLC receiver 416 are not altered, but the orientation sensor of the exemplary sensor subsystem may continue to communicate the orientation of the sectorized VLC/DLC receiver 416 to the gateway 102 and/or cloud servers 106. In another aspect, the sectorized VLC/DLC receiver 416 may slot in the bottom opening 415 in only a specific and constant way such that the system 100 including the gateway 102 and cloud servers 106 may determine the orientation of the sectorized VLC/DLC receiver 416 from the orientation of the 3D sensor clip 308 itself.

In the exemplary disclosed embodiments, the one or more downward facing sensors 412 can be low resolution imaging environment sensors as part of the sensor subsystem 108. The environment sensor(s) are used for monitoring the environmental conditions around the luminaires. In one exemplary embodiment, the environment sensors may include three or more different sensors: a low-resolution image sensor, an ambient light sensor, and a temperature sensor. In various exemplary embodiments in accordance with this disclosure, the environment sensor(s) may occupy one or more openings (e.g., 401, FIG. 4B) on the bottom of sensor housing 404 and/or may be located on one ore more bottom facing facets 300 of the sectorized VLC/DLC receiver 416 on the exemplary 3D sensor clip 308. The disclosure does not limit the number or type of environment sensors that may be used with the exemplary disclosed embodiments. Further, one ore more of the environment sensor(s) need not be on the 3D sensor clip 308. The environment sensor(s) may be placed in any location consistent with this disclosure.

Figure 6:
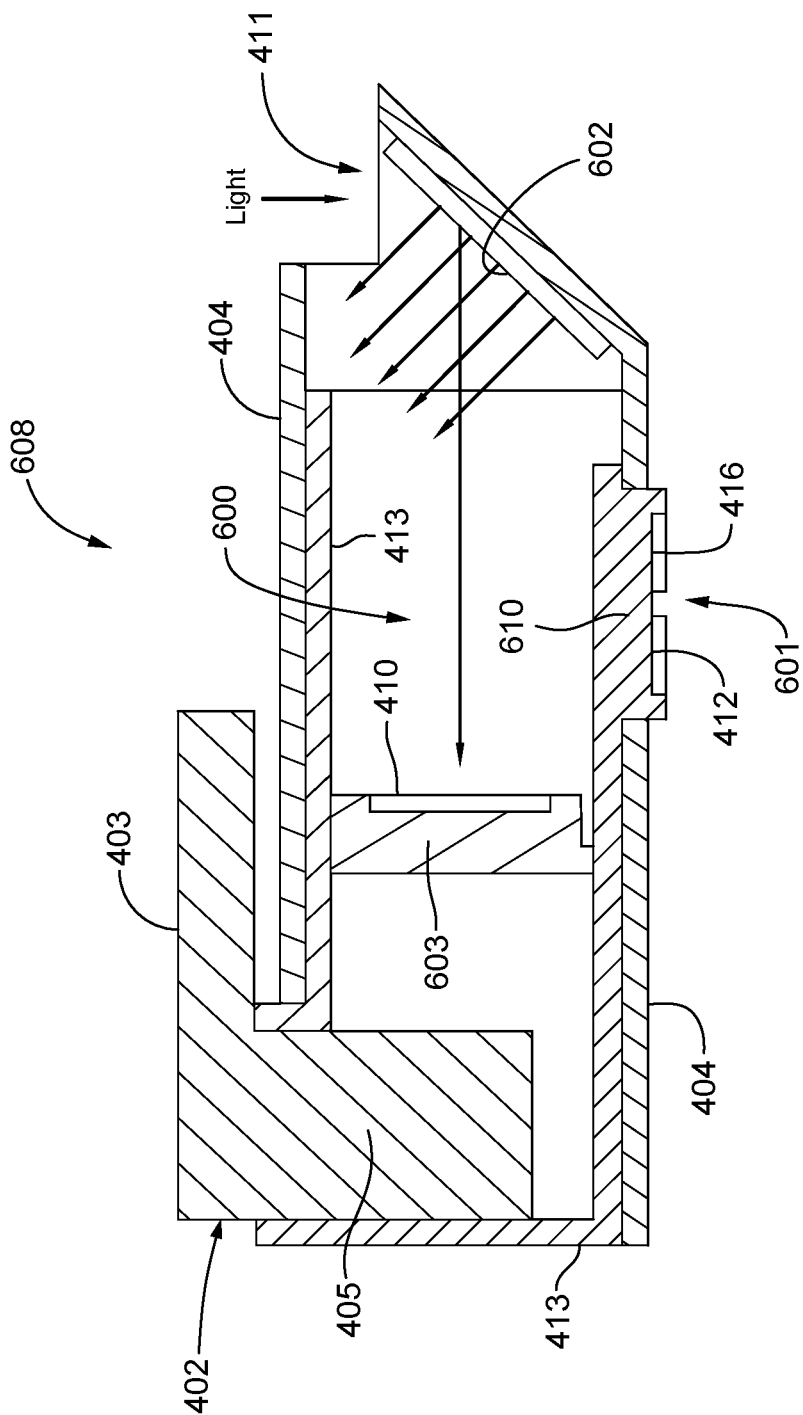
FIG. 6 illustrates an exemplary embodiment of a 3D sensor clip with an attenuation chamber and in a minimum dimensional configuration according to the disclosure.

With reference now to FIG. 6, an exemplary embodiment of a 3D sensor clip 608 having an attenuation chamber 600 is shown. In the exemplary attenuation chamber 600, incoming light coming from the luminaire is collected and collimated/attenuated to reduce the high luminous intensities of the incoming light, before the light strikes color sensor 410. In this embodiment, the color sensor 410 is positioned within the attenuation chamber 600 and is positioned on a vertical holder 603. The attenuation chamber averages/lowers the light intensity to allow a better performance of the color sensor 410. The color sensor 410 is encapsulated within the attenuation chamber 600 but not aligned with opening 411 in the exemplary embodiment shown in FIG. 6. Opening 411 provides an entrance for the incoming light and a reflective material 602, such as any known mirror, is configured inside the attenuation chamber 600 to direct reflected incoming light to the color sensor 410. The arrows show the direction of incoming and reflected light. Some light is scattered within sensor housing 404/attenuation chamber 600 prior to reaching color sensor 410. The amount of light that reaches the color sensor 410 can be varied by moving the sensor housing 404 relative to the sliding member 413 and adjusting the distance and angles from which light enters the attenuation chamber 600 and reflects off of reflective member 602.

The exemplary 3D sensor clip 608 shown in FIG. 6 also includes at least one downward facing environment sensor 412 and a sectorized VLC/DLC receiver 416 in an opening 601 on the bottom of a block 610 connected to sliding member 413 of the 3D sensor clip 608. In the exemplary disclosed embodiment, block 610 has an aperture (not shown) configured such that sensor housing 404 may be inserted through the aperture and travel through the aperture when sensor housing 404 is expanded relative to sliding member 413. The one or more environment sensors 412 and sectorized VLC/DLC receiver 416 occupy the same opening 601 in the exemplary embodiment shown in FIG. 6. As previously discussed with respect to FIGS. 4A-5B, in other exemplary embodiments one or more environment sensors 412 may be integrated on bottom, downward facing facets 300 of the sectorized VLC/DLC receiver 416 and/or additional openings may be present on the bottom of the 3D sensor clip 608, for example, on the sensor housing 404 and/or block 610, and the one or more environment sensors 412 may occupy such openings. In any of those exemplary configurations regarding environment sensors 412 in the exemplary embodiment shown in FIG. 6, the color sensor 410 is oriented at an approximately 90-degree angle to the downward facing environment sensors 412.

3D sensor clip 608 also includes sliding member 413, sensor housing 404, and attachment member 402 including attachment arm 403 and vertical leg 405 which are configured to adjust the dimensions and configuration of 3D sensor clip 608 according to the same disclosure provided with respect to FIGS. 4A-5B.

Further, exemplary 3D sensor clip 608 includes an orientation sensor (not shown) such as a magnetometer 3D orientation sensor configured to provide the gateway 102 and/or cloud servers 106 with the orientation of the sectorized VLC/DLC receiver 416, and direction/angle of each facet 300 (surface sensor) thereon, according to the same disclosure provided with respect to FIGS. 4A-5B.

Figure 7A:
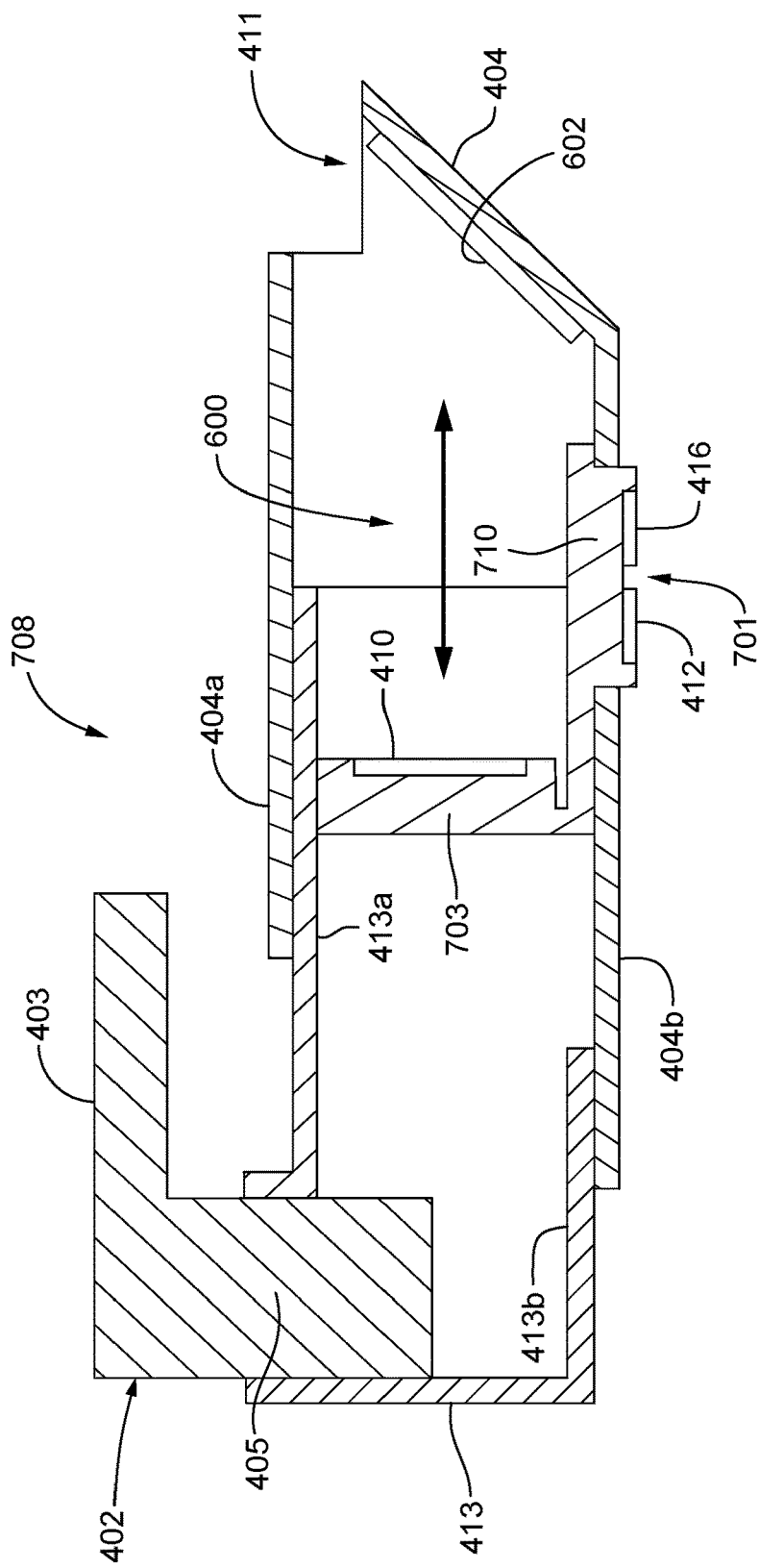
FIG. 7A illustrates a cross-sectional side view of an alternative exemplary embodiment of a 3D sensor clip with an attenuation chamber and in an expanded dimensional configuration according to the disclosure.
Figure 7B:
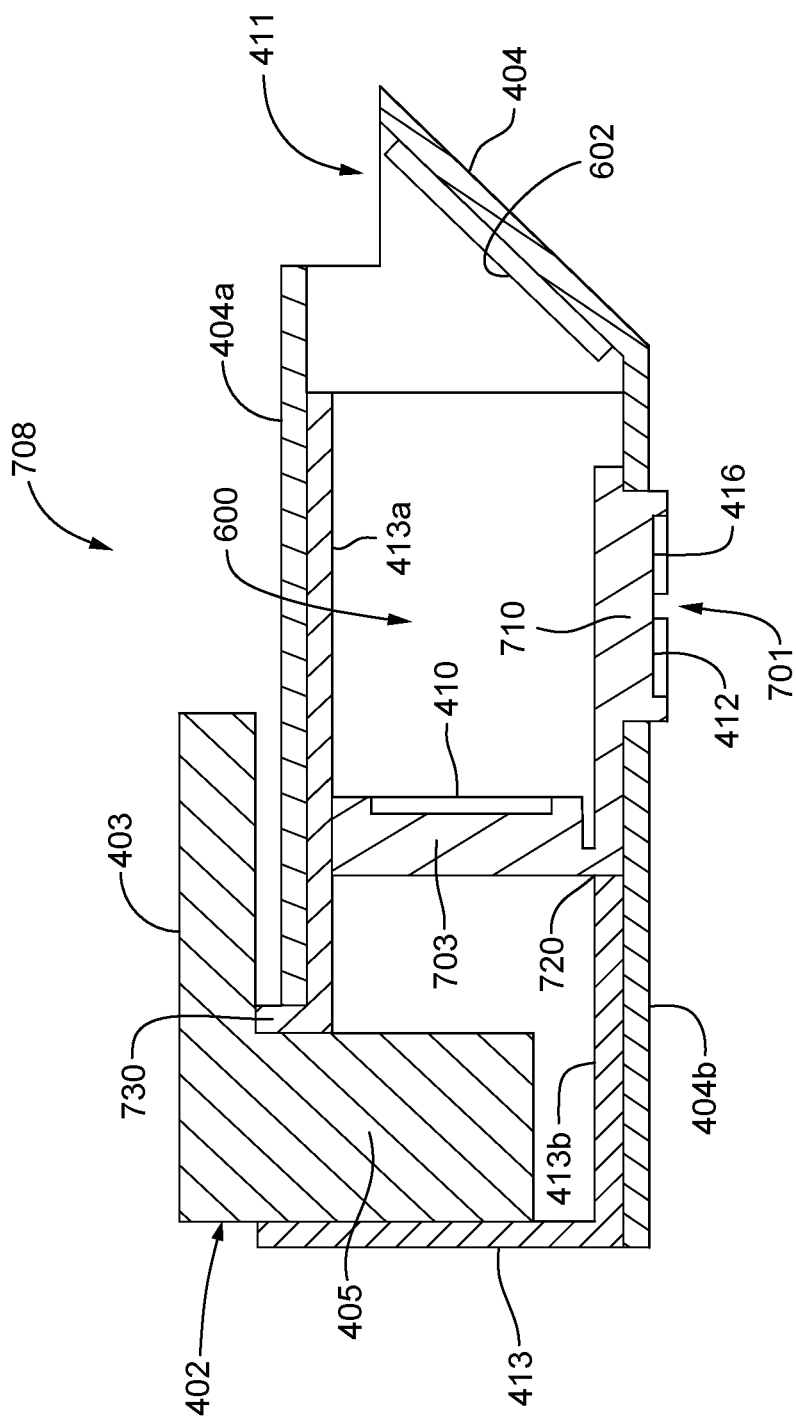
FIG. 7B illustrates a cross-sectional side view of the exemplary embodiment of the 3D sensor clip shown in FIG. 7A, in a minimum dimensional configuration according to the disclosure.

With reference now to FIGS. 7A and 7B, an exemplary 3D sensor clip 708 with an attenuation chamber 600 having a fixed size is shown. According to FIGS. 7A and 7B, the position of the sensor housing 404 is configured to move telescopically with respect to sliding member 413 (see FIG. 7A versus 7B), for example, to position opening 411 in a particular location under a luminaire 112. However, as shown in FIGS. 7A and 7B, the length of attenuation chamber 600, as measured by the distance from the color sensor 410 to the opening 411 and/or reflective material 602, remains fixed regardless of whether sensor housing 404 is in an expanded or compressed position. The length of the attenuation chamber 600 is fixed by attaching the color sensor 410 to the bottom portion 404*b* of sensor housing 404 that slides relative to the bottom portion 413*b* of sliding member 413. When the sensor housing 404 is moved to an expanded state (FIG. 7A), color sensor 410 moves with the bottom portion 413*b* sensor housing 404 and remains at a constant distance from opening 411/reflective material 602. When the sensor housing 404 is moved to a compressed state (FIG. 7B), the color sensor 410 moves with the bottom portion 413*b* of sensor housing 404 until the color sensor 410 and top portion 404*a* of the sensor housing 404 respectively abut lips 720, 730 of the bottom 413*b* and top 413*a* portions of sliding member 413, which prevents either the color sensor 410 or sensor housing 404 from moving any further and thereby maintains the distance between the color sensor 410 and the opening 411/reflective material 602.

The exemplary 3D sensor clip 708 shown in FIGS. 7A and 7B also includes at least one downward facing environment sensor 412 and a sectorized VLC/DLC receiver 416 in an opening 701 on the bottom of a block 710 connected to sensor housing 404. The one or more environment sensors 412 and sectorized VLC/DLC receiver 416 occupy the same opening 701 in the exemplary embodiment shown in FIG. 7. As previously discussed with respect to FIGS. 4A-6, in other exemplary embodiments one or more environment sensors 412 may be integrated on bottom, downward facing facets 300 of the sectorized VLC/DLC receiver 416 and/or additional openings may be present on the bottom of the 3D sensor clip 708, for example, on the sensor housing 404 and/or block 710, and the one or more environment sensors 412 may occupy such openings. In any of those exemplary configurations regarding environment sensors 412 in the exemplary embodiment shown in FIGS. 7A and 7B, the color sensor 410 is oriented at an approximately 90-degree angle to the downward facing environment sensors 412.

3D sensor clip 708 also includes sliding member 413, sensor housing 404, and attachment member 402 including attachment arm 403 and vertical leg 405 which are configured to adjust the dimensions and configuration of 3D sensor clip 708 according to the same disclosure provided with respect to FIGS. 4A-5B.

Further, exemplary 3D sensor clip 708 includes an orientation sensor (not shown) such as a magnetometer 3D orientation sensor configured to provide the gateway 102 and/or cloud servers 106 with the orientation of the sectorized VLC/DLC receiver 416, and direction/angle of each facet 300 (surface sensor) thereon, according to the same disclosure provided with respect to FIGS. 4A-5B.

Figure 8A:
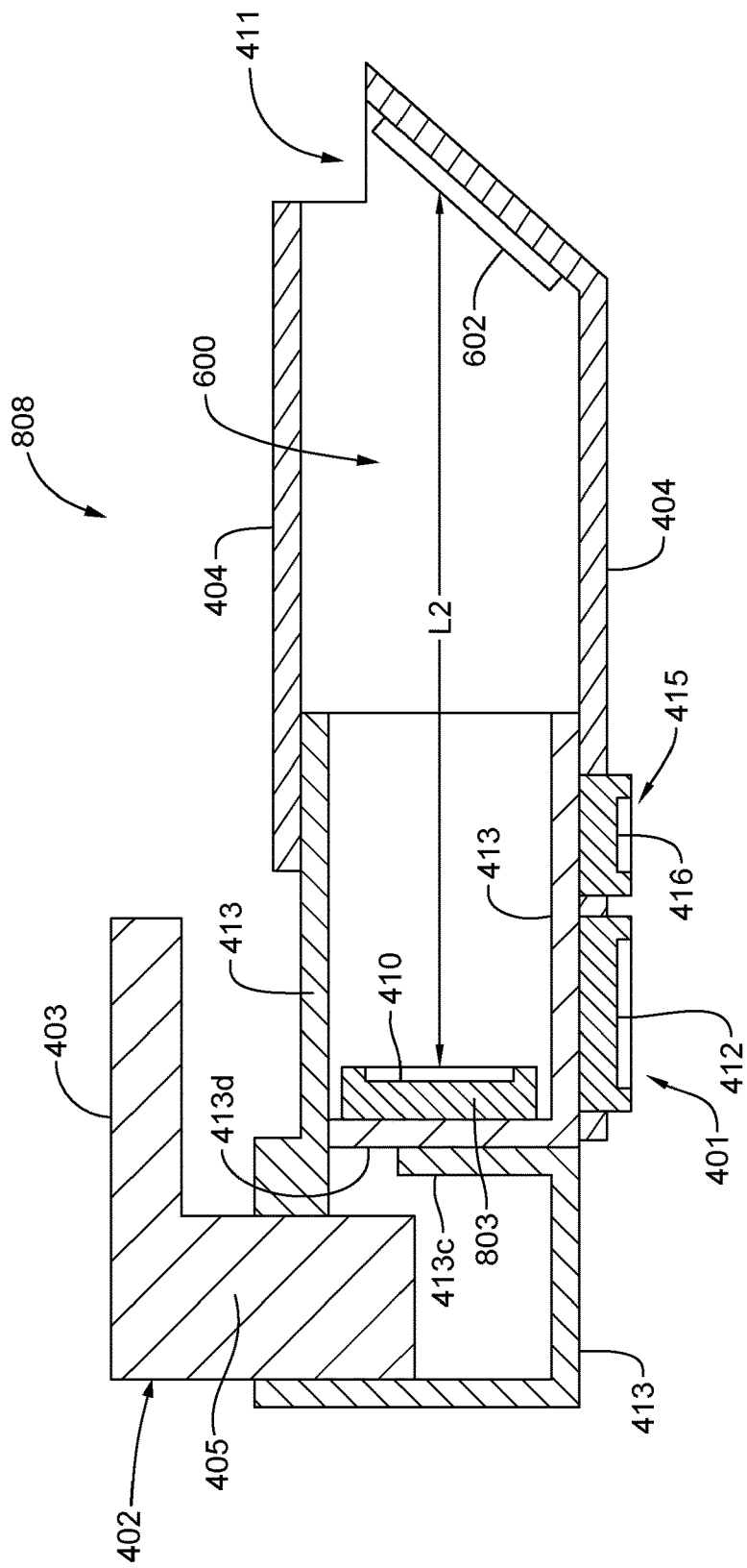
FIG. 8A illustrates a cross-sectional side view of another alternative exemplary embodiment of a 3D sensor clip with an attenuation chamber, in an expanded dimensional configuration according to the disclosure.
Figure 8B:
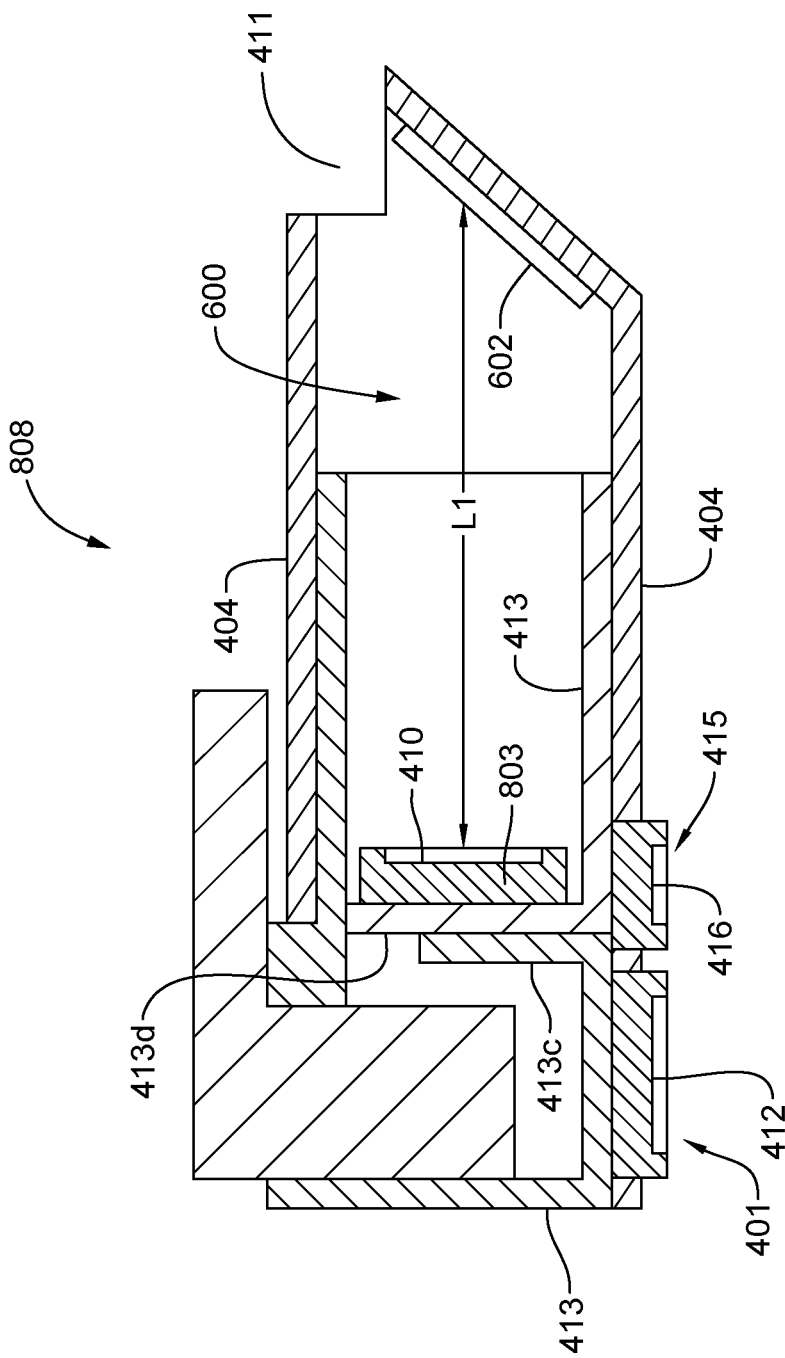
FIG. 8B illustrates a cross-sectional side view of the exemplary embodiment of the 3D sensor clip shown in FIG. 8A, in a minimum dimensional configuration according to the disclosure.

FIGS. 8A and 8B show an alternative exemplary 3D sensor clip 808 with a variable length attenuation chamber 600. The exemplary 3D sensor clip 808 includes sliding member 413, sensor housing 404, and attachment member 402 including attachment arm 403 and vertical leg 405 which are configured to adjust the dimensions and configuration of 3D sensor clip 808 according to the same disclosure provided with respect to FIGS. 4A-5B. Thus, 3D sensor clip 808 is adjustable from a minimum dimensional configuration (FIG. 8B) to a variety of expanded dimensional configurations (e.g., FIG. 8A). The length of the attenuation chamber 600, as measured by the distance from the color sensor 410 to the opening 411 and/or reflective material 602, varies depending on the position of the sensor housing 404 with respect to the sliding member 413. Thus, in an expanded position (e.g., FIG. 8A), attenuation chamber has a length L2 and in a compressed position (e.g., FIG. 8B) attenuation chamber has a length L1.

In the exemplary embodiment shown in FIGS. 8A and 8B, color sensor 410 is fixed to vertical wall 413d of sliding member 413. Sliding member 413 comprises two sections, each including a vertical wall 413c, 413d. Vertical walls 413c, 413d are connected to join and maintain the two sections of sliding member 413. The vertical walls 413c, 413d are fixed and stationary at an end of the attenuation chamber 600 that is opposite opening 411. Thus, as sensor housing 404 is slidingly moved with respect to sliding member 413 in the exemplary embodiment of FIGS. 8A and 8B, the position of, e.g., opening 411 may be horizontally adjusted while vertical walls 413c, 413d and color sensor 410 remain in a fixed and stationary position inside the attenuation chamber 600 and the amount of light to which color sensor 410 (and environment sensor 412 and sectorized VLC/DLC receiver 416) is exposed is varied.

The exemplary 3D sensor clip 808 shown in FIGS. 8A and 8B also includes at least one downward facing environment sensor 412 and a sectorized VLC/DLC receiver 416 on the bottom of sensor housing 404. The environment sensor 412 and sectorized VLC/DLC receiver 416 may be respectively contained in openings 401, 415. As shown in FIGS. 8A and 8B, the environment sensor 412 and sectorized VLC/DLC receiver 416 may be connected to the sensor housing 404 such that they move with the sensor housing 404 when the sensor housing 404 is slidingly moved with respect to the sliding member 413. In other exemplary disclosed embodiments, environment sensor 412 and sectorized VLC/DLC receiver 416 may be attached to sliding member 413 of 3D sensor clip 808 via a block (not shown), such as block 610 (see FIG. 6), having an aperture configured to receive sensor housing 404 and allow sensor housing 404 to travel through the aperture while slidingly moving with respect to sliding member 413. In such embodiment, environment sensor 412 and sectorized VLC/DLC receiver 416 would remain stationary on the sliding member 413 as sensor housing 404 was slidingly moved.

In the exemplary embodiment shown in FIGS. 8A and 8B, the at least one environment sensor 412 and sectorized VLC/DLC receiver 416 occupy separate openings/spaces 401, 415. As previously discussed with respect to FIGS. 4A-7B, in other exemplary embodiments the environment sensor(s) 412 and sectorized VLC/DLC receiver 416 may occupy a single space (opening), one or more environment sensors 412 may be integrated on bottom, downward facing facets 300 of the sectorized VLC/DLC receiver 416, and/or additional openings may be present on the bottom of the 3D sensor clip 808 to accommodate additional sensors or components, such as an orientation sensor. In the exemplary configurations according to FIGS. 8A-8B, the color sensor 410 is oriented at an approximately 90-degree angle to downward facing environment sensors 412.

Further, exemplary 3D sensor clip 808 includes an orientation sensor (not shown) such as a magnetometer 3D orientation sensor configured to provide the gateway 102 and/or cloud servers 106 with the orientation of the sectorized VLC/DLC receiver 416, and direction/angle of each facet 300 (surface sensor) thereon, according to the same disclosure provided with respect to FIGS. 4A-5B.

Figure 9:
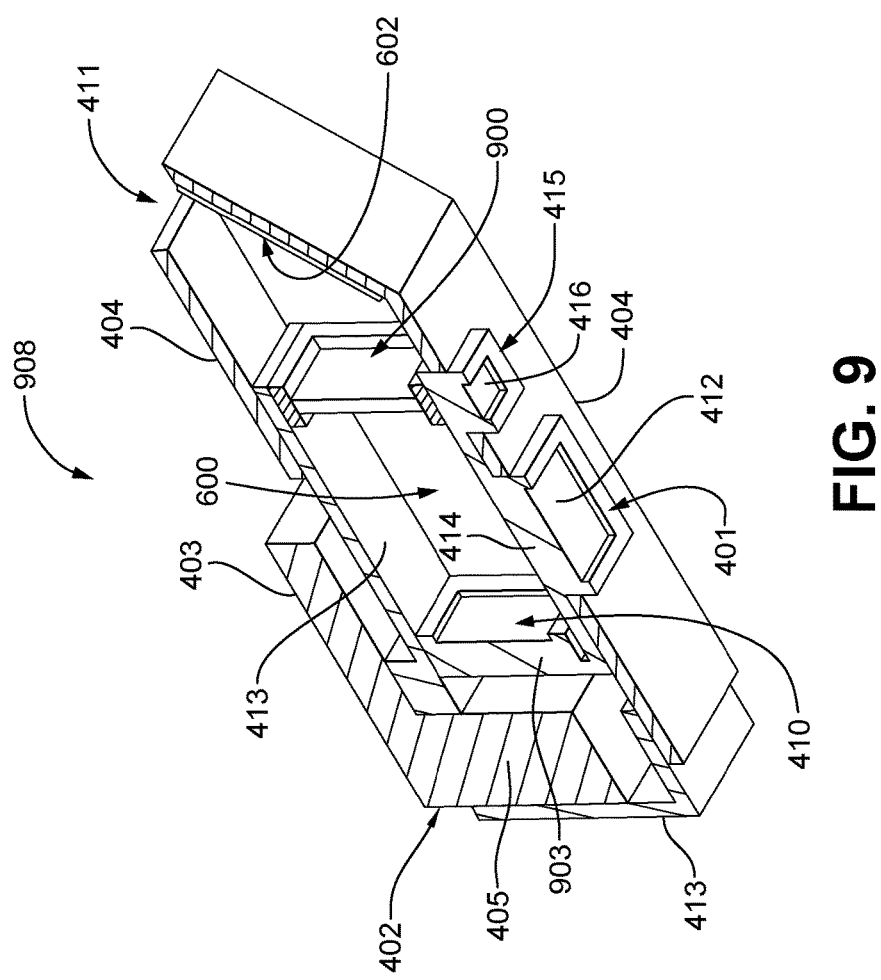
FIG. 9 illustrates a bottom perspective cross-sectional view of another exemplary embodiment of a 3D sensor clip, with an attenuation chamber, a dynamic dampening and filtering screen, and in a minimum dimensional configuration according to the disclosure.

FIG. 9 depicts an exemplary embodiment of a 3D sensor clip system 908 in which a Dynamic Attachable Dampening and Filtering Screen 900 (DADFS) is present in the attenuation chamber 600 between the reflecting material 602 and the color sensor 410. The DADFS 900 performs at least a filtering operation and/or at least a dampening operation on light that passes through it on the way to the color sensor 410. The filtering operation, as an example, can remove at least a portion of non-visible Infra Red (IR) or Ultra Violet (UV) wavelengths present in the incoming light. The dampening operation may reduce the lumen/lux level of incoming light. Both of these operations support extending a life or longevity of the color sensor 410 by reducing exposure of the color sensor 410 to potentially damaging light. Different DADFS's 900 having different filtering and/or dampening ranges may be used depending on a variety of factors including, for example and without limitation, the type of luminaire 112 on which the 3D sensor clip 908 is installed and the type of color sensor 410.

The exemplary 3D sensor clip 908 also includes at least one environment sensor 412 and a sectorized VLC/DLC receiver 416 respectively in openings 401 and 415. The environment sensor 412 and the sectorized VLC/DLC receiver 416 are positioned on at least one mounting member 414 which extends through the outer surface of the sensor housing 404. In other embodiments in accordance with the disclosure with respect to, e.g., FIGS. 4A-5B, the environment sensor 412 and sectorized VLC/DLC receiver 416 may occupy one or more openings on the 3D sensor clip 908 and/or the environment sensor 412 may be integrated with the sectorized VLC/DLC receiver 416 as a bottom, downward facing facet 300 of the sectorized VLC/DLC receiver 416. In the exemplary disclosed embodiments that include a downward facing environment sensor 412, the color sensor 410 of 3D sensor clip 908 shown in FIG. 9 is at an approximately 90-degree angle to the downward facing environment sensor(s) 412.

According to an aspect of the exemplary 3D sensor clip 908, the attenuation chamber 600 has a fixed size, as measured from the color sensor 410 to the opening 411/reflecting material 602, regardless of whether sensor housing 404 is silidingly moved with respect to sliding member 413, because the DADFS 900, color sensor 410, and environment sensor 412 and sectorized VLC/DLC receiver 416 are attached to sensor housing 404 in a fixed configuration.

The exemplary 3D sensor clip 908 also includes sliding member 413, sensor housing 404, and attachment member 402 including attachment arm 403 and vertical leg 405 which are configured to adjust the dimensions and configuration of 3D sensor clip 908 according to the same disclosure provided with respect to FIGS. 4A-5B.

Further, exemplary 3D sensor clip 908 includes an orientation sensor (not shown) such as a magnetometer 3D orientation sensor configured to provide the gateway 102 and/or cloud servers 106 with the orientation of the sectorized VLC/DLC receiver 416, and direction/angle of each facet 300 (surface sensor) thereon, according to the same disclosure provided with respect to FIGS. 4A-5B.

Figure 10:
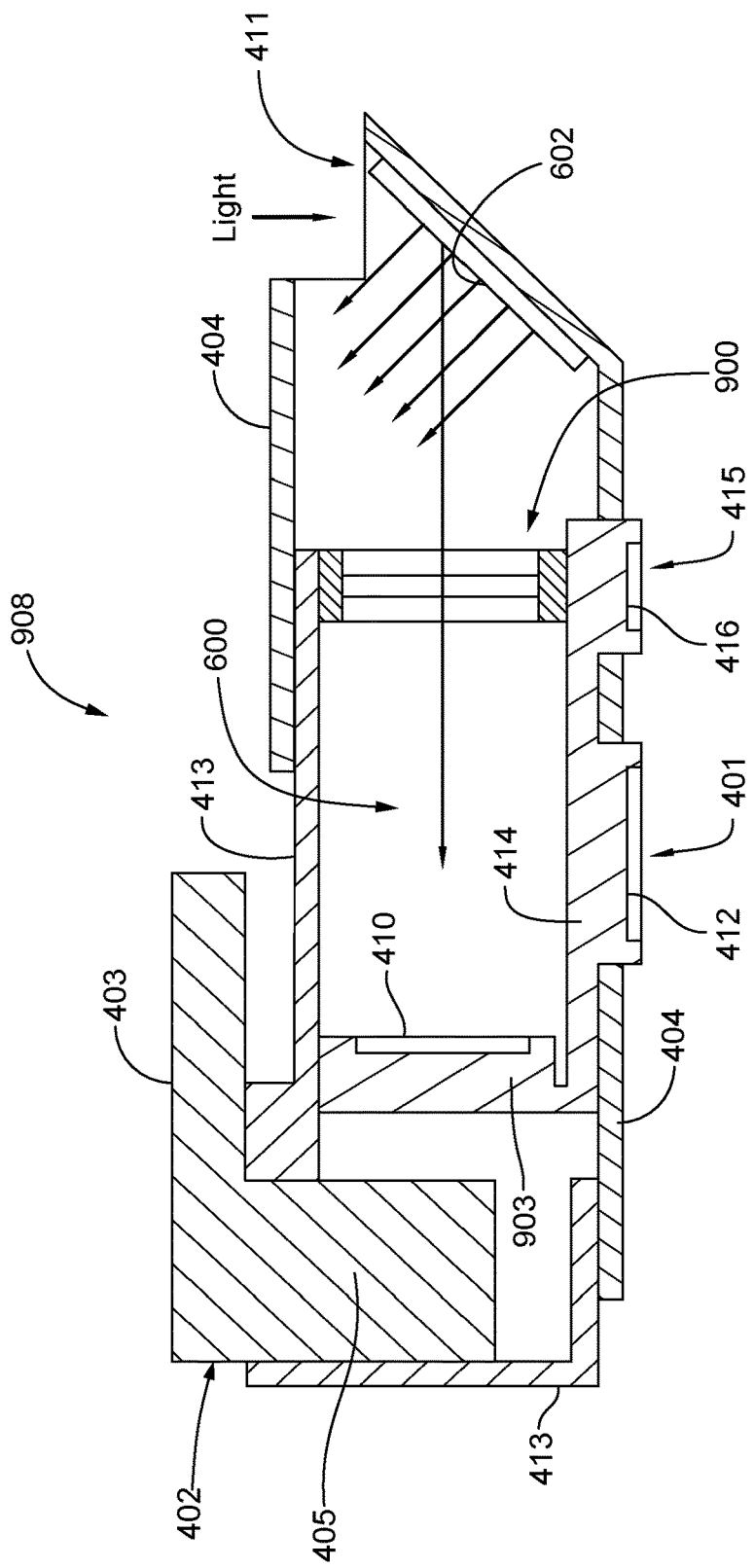
FIG. 10 illustrates a cross-sectional side view of another exemplary embodiment of a 3D sensor clip, with an attenuation chamber, a dynamic dampening and filtering screen, and in a minimum dimensional configuration according to the disclosure.

With reference now to FIG. 10, a side cross-sectional view of the exemplary embodiment of the 3D sensor clip 908 shown in FIG. 9 is shown.

In one aspect, the disclosure provides a method of sensing illumination properties of a luminaire, by: providing a 3D sensor clip having a sensor housing having at least one light receiving opening and one or more downward facing (bottom) openings therein, wherein the 3D sensor clip is configured for attaching to a luminaire; adjusting at least one attachment member extending from the sensor housing to attach the 3D sensor clip to a luminaire; adjusting the sensor housing to receive light from the luminaire into the sensor housing and thereby a color sensor/RGB sensor, through a light receiving opening in the sensor housing that is aligned with the color sensor/RGB sensor. In another aspect of the method the level of exposure of the color sensor/RGB sensor to the light that the luminaire emits is varied by adjusting at least one attachment member and/or the sensor housing of the 3D sensor clip to change the position of the light receiving opening and/or color sensor/RGB sensor relative to the luminaire and the light that the luminaire emits. In yet another aspect of the method the level of exposure of the color sensor/RGB sensor to the light that the luminaire emits is varied by providing an attenuation chamber on the 3D sensor clip, wherein the attenuation chamber is configured to reduce and/or alter the amount and/or type of light that ultimately impinges the color sensor/RGB sensor.

In another aspect of the exemplary disclosed embodiments, a method for sensing illumination properties of a luminaire and/or an environment in which the luminaire is installed includes providing a 3D sensor clip as described, for example, in the exemplary disclosed embodiment, including at least one environment sensor that is configured to face in a downward direction or away from the direct light emitted by the luminaire. Exemplary disclosed embodiments of the method include, without limitation, measuring with the one or more environment sensors an ambient temperature, ambient light level, motion, footfall, etc.

In another aspect of the exemplary disclosed embodiments, a method for sensing illumination properties of a luminaire and/or an environment in which the luminaire is installed includes providing a 3D sensor clip as described, for example, in the exemplary disclosed embodiment, including at least one sectorized VLC/DLC receiver; transmitting a VLC signal from a luminaire; receiving at the sectorized VLC/DLC receiver the transmitted VLC signal, and; using information regarding the received light to determine at least one of an identity of the transmitting luminaire in a networked lighting system and a distance and direction of the transmitting luminaire relative to the sectorized VLC/DLC receiver. In yet another aspect of the exemplary disclosed method for determining a direction of the transmitting luminaire relative to the sectorized VLC/DLC receiver, the 3D sensor clip is provided with an orientation sensor such as a magnetometer 3D sensor/orientation sensor and the orientation of the sectorized VLC/DLC receiver is determined by the magnetometer 3D sensor/orientation sensor.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, exemplary embodiments may lie in less than all features of a single foregoing disclosed exemplary embodiments, configurations, or aspects. Thus, the following claims are hereby incorporated into this Detailed Description, with each claim standing on its own as a separate embodiment of the present disclosure.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art, after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The components of the apparatus illustrated are not limited to the specific embodiments described herein, but rather, features illustrated or described as part of one embodiment can be used on or in conjunction with other embodiments to yield yet a further embodiment. It is intended that the apparatus include such modifications and variations. Further, steps described in the method may be utilized independently and separately from other steps described herein.

While the apparatus and method have been described with reference to specific embodiments, it will be understood by those skilled in the art that various changes may be made and equivalents may be substituted for elements thereof without departing from the scope contemplated. In addition, many modifications may be made to adapt a particular situation or material to the teachings found herein without departing from the essential scope thereof.

In this specification and the claims that follow, reference will be made to a number of terms that have the following meanings. The singular forms "a," "an" and "the" include plural referents unless the context clearly dictates otherwise. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", "top", "bottom" etc. are used to identify one element from another, and unless otherwise specified are not meant to refer to a particular order, orientation or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of" Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A three-dimensional (3D) visual light communication (VLC)/dark light communication (DLC) sensor clip, comprising:
    a housing having at least one light receiving opening configured to receive light from a luminaire;
    at least one upward facing sensor configured to receive light from the luminaire through the light receiving opening;
    at least one downward facing sensor configured to face away from the luminaire and measure ambient light levels in an environment in which the luminaire is installed;
    at least one sectorized VLC/DLC receiver including at least one light receiving surface; and,
    an orientation sensor configured to detect a direction in which the at least one light receiving surface of the VLC/DLC receiver is facing.

2. The 3D VLC/DLC sensor clip of claim 1, further comprising at least one attachment member and at least one sliding member each configured to adjustably and removably connect the housing to a variety of different types of luminaires and/or fixtures in which a luminaire is installed and adjustably position the housing relative to the luminaire such that the upward facing sensor is in a position to face the luminaire directly through the light receiving opening.

3. The 3D VLC/DLC sensor clip of claim 1, wherein the upward facing sensor is a color sensor configured to measure at least one of a color content and a color intensity of the luminaire.

4. The 3D VLC/DLC sensor clip of claim 3, wherein the color sensor is at least one of a Red, Green, Blue (RGB) sensor and a Yellow, Red, Green, Blue (YRGB) sensor.

5. The 3D VLC/DLC sensor clip of claim 1, wherein the at least one light receiving surface of the VLC/DLC receiver includes at least one of the downward facing sensor and the orientation sensor.

6. The 3D VLC/DLC sensor clip of claim 1, further comprising an attenuation chamber configured to receive light from the luminaire through the light receiving opening and including a light reflecting material configured to reflect the light received through the light receiving opening toward the upward facing sensor.

7. The 3D VLC/DLC sensor clip of claim 6, wherein the color sensor is configured at an approximately 90-degree angle to the environment sensor.

8. The 3D VLC/DLC sensor clip of claim 7, further comprising a Dynamic Attachable Dampening and Filtering Screen (DADFS) positioned between at least a portion of the reflecting material and the color sensor.

9. The 3D sensor clip of claim 1, wherein the orientation sensor is a magnetometer 3D sensor.

10. A system for automated identification and location of a luminaire, comprising:

a first three-dimensional (3D) sensor clip including a visual light communication (VLC)/dark light communication (DLC) receiver having at least one light receiving surface;

an orientation sensor configured to detect a direction in which at least one of the 3D sensor clip and the at least one light receiving surface of the VLC/DLC receiver is facing; and, a server in communication with at least one of the sectorized VLC/DLC receiver and the orientation sensor, wherein the VLC/DLC receiver is configured to receive light transmitted from a luminaire at the at least one VLC/DLC light receiving surface and transmit information regarding the transmitted visual light received at the at least one VLC/DLC light receiving surface to the server and the orientation sensor is configured to transmit information regarding the direction in which at least one of the 3D sensor clip and the at least one light receiving surface of the VLC/DLC receiver is facing to the server, and the server is configured to determine from the information regarding the transmitted visual light received at the at least one VLC/DLC light receiving surface and/or the direction in which the 3D sensor clip and/or at least one light receiving surface of the VLC/DLC receiver is facing at least one of an identity of the luminaire and a relative distance and direction of the luminaire from the sectorized VLC/DLC receiver.

11. The system of claim 10, wherein the server is configured to determine a relative distance and direction of the luminaire from the sectorized VLC/DLC receiver based at least in part on where on the at least one VLC/DLC light receiving surface the transmitted visual light is received.

12. The system of claim 10, further comprising a gateway configured to control illumination of the luminaire.

13. The system of claim 12, wherein the gateway is further configured to control illumination of the luminaire to transmit visual light in a manner such as to uniquely identify the first luminaire.

14. The system of claim 12, further comprising a second 3D sensor clip configured to adjustably and removably attach to the luminaire, wherein the second 3D sensor clip includes at least one upward facing sensor configured to face the luminaire directly and measure at least one of a color content and a color intensity of the luminaire and at least one environment sensor configured to face away or in a downward direction from the luminaire and measure at least an ambient light level of an environment in which the luminaire is installed, wherein the upward facing sensor and environment sensor respectively are further configured to transmit information regarding the color content and/or color intensity and ambient light level to the server.

15. The system of claim 14, wherein the server is configure to determine the relative distance and direction of the luminaire from the sectorized VLC/DLC receiver based at least in part on where on the at least one VLC/DLC light receiving surface the transmitted visual light is received and at least one of the color content and/or color intensity of the luminaire and the ambient light level.

16. The system of claim 10, wherein the orientation sensor is a magnetometer 3D sensor.

17. The system of claim 10, wherein the orientation sensor is integrated in the sectorized VLC/DLC receiver.

18. A method for automated identification and location of a luminaire, comprising:

transmitting visual light from a luminaire;

receiving the transmitted visual light by at least one light receiving surface of a sectorized visual light communication (VLC)/dark light communication (DLC) receiver;

determining with an orientation sensor a direction in which the at least one VLC/DLC light receiving surface is facing;

transmitting information regarding the transmitted visual light received at the at least one VLC/DLC light receiving surface and direction in which the at least one VLC/DLC light receiving surface is facing respectively from the sectorized VLC/DLC receiver and orientation sensor to a server; and, determining with the server at least one of an identity of the luminaire and a relative distance and direction of the luminaire from the sectorized VLC/DLC receiver, based at least in part on at least one of the information regarding the transmitted visual light received at the at least one VLC/DLC light receiving surface and direction in which the at least one VLC/DLC light receiving surface is facing.

19. The method of claim 18, wherein the sectorized VLC/DLC receiver is attached to a three-dimensional (3D) sensor clip configured to adjustably and removably attach to a variety of luminaires and/or fixtures in which a luminaire is installed.

20. The method of claim 19, further comprising attaching the 3D sensor clip to a luminaire or fixture in which a luminaire is installed by adjusting the position of at least one of an attachment member, a sliding member, and a housing.

* * * * *